United States Patent
Bossemeyer, Jr. et al.

(10) Patent No.: US 7,596,129 B2
(45) Date of Patent: Sep. 29, 2009

(54) HOME GATEWAY SYSTEMS AND METHODS TO ESTABLISH COMMUNICATION SESSIONS

(75) Inventors: Robert Wesley Bossemeyer, Jr., St. Charles, IL (US); Donald Bernard Liebrecht, West Dundee, IL (US); Raymond Walden Bennett, III, Naperville, IL (US); Barry James Sullivan, Long Grove, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 689 days.

(21) Appl. No.: 09/931,288

(22) Filed: Aug. 16, 2001

(65) Prior Publication Data

US 2002/0037004 A1 Mar. 28, 2002

Related U.S. Application Data

(63) Continuation-in-part of application No. 09/096,560, filed on Jun. 12, 1998, now Pat. No. 7,349,682, and a continuation-in-part of application No. 09/061,833, filed on Apr. 16, 1998, now abandoned, and a continuation-in-part of application No. 09/040,205, filed on Mar. 13, 1998, now abandoned.

(51) Int. Cl.
*H04L 12/66* (2006.01)
*H04L 12/28* (2006.01)

(52) U.S. Cl. ...................................... 370/352; 370/401
(58) Field of Classification Search ......... 370/352–356, 370/400–401; 379/88.17
See application file for complete search history.

(56) References Cited

U.S. PATENT DOCUMENTS

| 5,742,905 | A | | 4/1998 | Pepe et al. |
| 5,864,604 | A | * | 1/1999 | Moen et al. ............... 379/114.2 |
| 5,867,495 | A | | 2/1999 | Elliott et al. |
| 5,898,780 | A | * | 4/1999 | Liu et al. ..................... 713/155 |
| 5,905,781 | A | * | 5/1999 | McHale et al. ............ 379/93.14 |
| 6,021,419 | A | * | 2/2000 | Clarke et al. ................. 708/300 |
| 6,026,151 | A | * | 2/2000 | Bauer et al. ............ 379/114.24 |
| 6,069,890 | A | * | 5/2000 | White et al. ................. 370/352 |
| 6,125,126 | A | * | 9/2000 | Hallenst.ang.l ............. 370/522 |
| 6,137,877 | A | * | 10/2000 | Robin et al. ................. 379/352 |
| 6,161,128 | A | | 12/2000 | Smyk |
| 6,175,618 | B1 | * | 1/2001 | Shah et al. ............. 379/207.13 |
| 6,188,683 | B1 | * | 2/2001 | Lang et al. ................... 370/352 |
| 6,226,373 | B1 | * | 5/2001 | Zhu et al. ............. 379/207.02 |
| 6,243,376 | B1 | * | 6/2001 | Ng et al. ..................... 370/352 |

(Continued)

FOREIGN PATENT DOCUMENTS

WO WO 99/53654 * 10/1999

*Primary Examiner*—Hong Cho
(74) *Attorney, Agent, or Firm*—Hanley, Flight and Zimmerman, LLC

(57) ABSTRACT

A home gateway system (20) includes a transceiver (50) connected to a switch (52). A processor (54) is connected to the switch (52) and provides intelligent functions for the switch (52). A router (56) is connected to the switch (52). The router (56) upon receiving a data packet from an internal port where the data packet has an external address, routes the data packet through the switch (52) to the processor (54). The processor (54) directs the transceiver (50) to establish a telephony connection with an internet service provider (34) and sends the data packet to the internet service provider (34).

20 Claims, 21 Drawing Sheets

U.S. PATENT DOCUMENTS

| | | | |
|---|---|---|---|
| 6,262,982 B1 * | 7/2001 | Donahue et al. | 370/352 |
| 6,272,126 B1 * | 8/2001 | Strauss et al. | 370/352 |
| 6,301,350 B1 * | 10/2001 | Henningson et al. | 379/220.01 |
| 6,317,884 B1 * | 11/2001 | Eames et al. | 709/217 |
| 6,343,115 B1 | 1/2002 | Foladare et al. | |
| 6,377,568 B1 * | 4/2002 | Kelly | 370/352 |
| 6,430,282 B1 | 8/2002 | Bannister et al. | |
| 6,487,598 B1 * | 11/2002 | Valencia | 709/227 |
| 6,542,500 B1 * | 4/2003 | Gerszberg et al. | 370/354 |
| 6,546,003 B1 * | 4/2003 | Farris | 370/352 |
| 6,597,687 B1 * | 7/2003 | Rao | 370/352 |
| 6,791,952 B2 * | 9/2004 | Lin et al. | 370/281 |
| 6,870,827 B1 * | 3/2005 | Voit et al. | 370/352 |
| 6,961,312 B2 * | 11/2005 | Kubler et al. | 370/238 |
| 7,336,649 B1 | 2/2008 | Huang | |
| 2001/0055299 A1 * | 12/2001 | Kelly | 370/352 |
| 2006/0034265 A1 * | 2/2006 | Thompson | 370/352 |

* cited by examiner

HOME GATEWAY SYSTEMS AND METHODS TO ESTABLISH COMMUNICATION SESSIONS

RELATED APPLICATIONS

This patent is a continuation-in-part of the patent application Ser. No. 09/061,833, entitled "Home Gateway System with Telephony Functions And Method", filed on Apr. 16, 1998 now abandoned, and the patent application Ser. No. 09/040,205, entitled "Home Gateway System And Method", filed on Mar. 13, 1998 now abandoned and the patent application Ser. No. 09/096,560, entitled "Home Security and Automation Features for a Home Gateway", filed Jun. 12, 1998 now U.S. Pat. No. 7,349,682 all having the same assignee.

FIELD OF THE INVENTION

The present invention relates to the field of communication systems and more particularly to a home gateway system and method.

BACKGROUND OF THE INVENTION

Home owners often have a variety of machines for receiving information services, such as a cable receiver box, several telephones, an answering machine, a caller ID box, a home Local Area Network (LAN), and a dial up connection to the internet. Each information carrier feels compelled to have their own software and hardware. Presently all these different machines operate separately and often redundantly. These information carriers are now offering each other's products. Cable television operators want to provide the home owner with telephone service, while telephone companies want to provide cable television services. Satellite television services want to offer high speed connections to the internet. The user is often overwhelmed by the multitude of choices and is not interested in learning the different hardware and software requirements for each of these different carriers of information.

Thus there exists a need for a home gateway system that can integrate the functions of these various devices, so that a user need not concern himself with the particular carrier providing the service.

DETAILED DESCRIPTION OF THE DRAWINGS

A home gateway system provides a way of integrating the information carrying needs of a homeowner such as a telephone, caller ID, internet-dial up, cable or satellite television by combining their functions. The combination of these devices provides even more new functions such as, home automation and home security.

A home gateway system has a transceiver that is capable of establishing a wireless local loop connection. One embodiment of a home gateway system includes a transceiver connected to a switch. A processor is connected to the switch and provides intelligent functions for the switch. A router is connected to the switch. The router upon receiving a data packet from an internal port with an external address; routes the data packet through the switch to the processor. The processor directs the transceiver to establish a telephony connection with a variety of other systems. Such as, connection to an internet service provider.

A voice processing and caller ID system can be connected to the processor to provide telephony answering and screening services. For instance, a caller ID system can identify an incoming caller and a switch can be used to route these calls to a voice mail system. The caller identification processing system determines a telephone number of the incoming call. Routing the incoming call to the voice processing system if the telephone number belongs to a screened group of telephone numbers. The voice processing system is capable of storing a message from an incoming call.

The transceiver can also be used to establish a communication channel over a wireless local loop for home automation and security. A home automation controller is capable of sending and receiving a message with the wireless local transceiver. A home security controller is capable of sending and receiving a message with the wireless local loop transceiver and the home automation controller. This allows the security system and the automation system to be activated, deactivated and monitored remotely.

Numerous other advantages and synergy's will become apparent in the appended specification.

Figure 1:
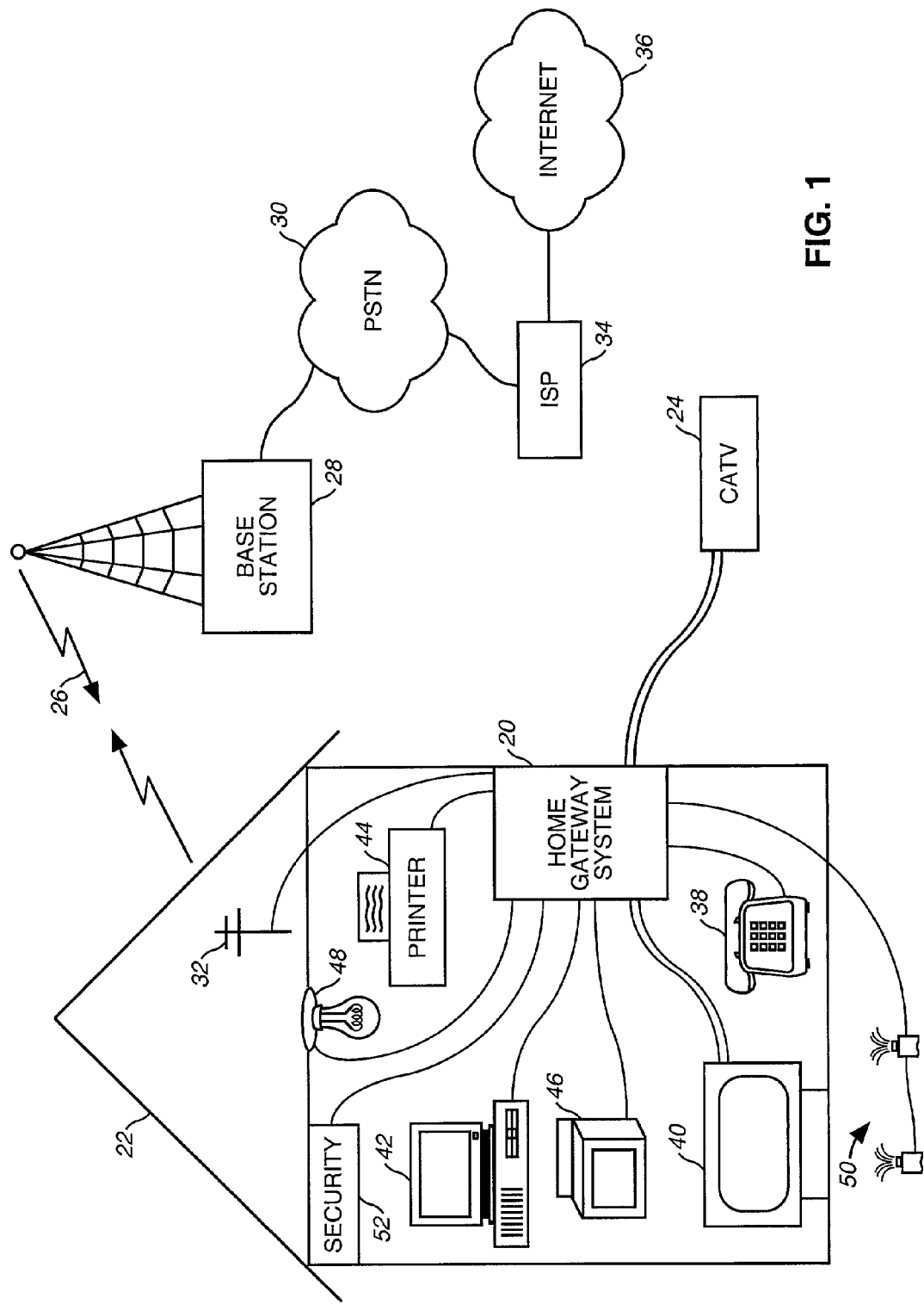
FIG. 1 is a schematic diagram of a home gateway system connected to a variety of information carriers in accordance with one embodiment of the invention.

FIG. 1 is a schematic diagram of a home gateway system 20 with telephony functions connected to a variety of communication carriers in accordance with one embodiment of the invention. The home gateway system 20 is located inside a house 22. The home gateway system 20 has an input to receive a cable television (satellite, XDSL, ADSL) 24 signal. The home gateway system 20 is also connected by a wireless local loop 26 and a base station 28 to the public switch telephone network (PSTN) 30. The antenna 32 for the wireless local loop 26 is shown in the attic of the house. The PSTN 30 provides access to an internet service provider (ISP) 34, which provides access to the internet 36. A telephone 38, television 40, computer 42 and printer 44 can all be connected to the home gateway system 20. The home gateway system 20 allows the computer 42 to talk to the printer 44 or to the ISP 34. The telephone 38 can place a standard telephone call over the PSTN 30 or place a data telephone call over the internet 36 (Note data telephone call means a call over data service such as the internet). In addition, appliances 46, lights 48 and sprinkling systems 50 can be connected to the home gateway system as part of the home automation features. A home security system 52 can also be connected to the home gateway system 20. This allows the home automation and security features to be integrated into the home communication system. For instance, the computer 42 can be used to setup times of day for the sprinkling system to turn on or the computer can print a report of the activities of the appliances or the security systems.

Figure 2:
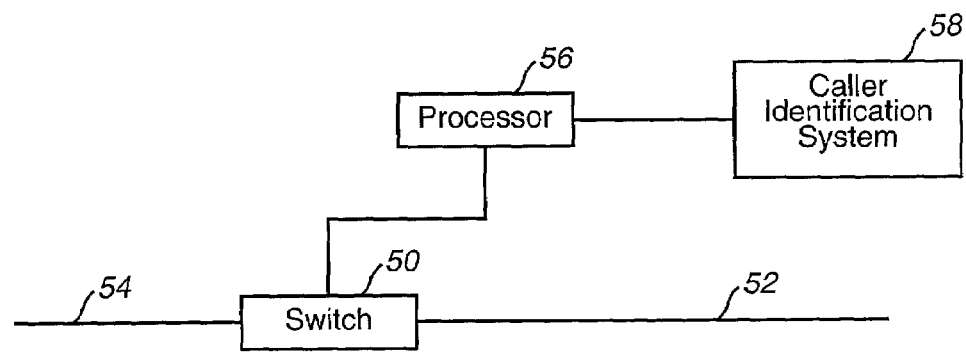
FIG. 2 is a block diagram of a home gateway system in accordance with one embodiment of the invention.

FIG. 2 is a block diagram of a home gateway system 20 with telephony functions in accordance with one embodiment of the invention. In this embodiment a switch 50 is connected to an external telephony channel 52 and an internal telephony channel (plurality of internal telephone lines) 54. Note that the switch can be an ethernet hub switch. Hub switches are intelligent enough to read incoming instructions and determine how to forward data in addition, the switch may be programmed to forward incoming instructions to the processor 56 for further information. Similar to a SS7 (Signaling System 7) connection between an SCP (Switch Control Point) and an SSP (Service Switching Point). Note that the switch is a physical connection switch or one to one switch. As a result the switch can be crossbar switch, a shared memory switch or a high-speed bus switch. In one embodiment the external telephony channel 52 is a xDSL (Digital Subscriber Line) link with a central office, such as an ADSL (Asymmetrical digital Subscriber Line) Link. The xDSL link provides one or more derived digital voice channels as described in the copending application, U.S. patent application Ser. No. 08/742,164, entitled "Method and Apparatus for Providing a derived Digital Telephone Voice Channel", filed on Nov. 1, 1996, assigned to the same assignee as the present invention and the subject matter of which is incorporated herein by reference thereto. The external telephony channel 52 using the invention described in the above referenced application provides a plurality of digital derived telephone channels and a data channel of such an ADSL link. A processor 56 is connected to the switch 50. The processor (controller) 56 sends and receives messages from the switch 50. The messages could be in an SS7 format or IC to IC format (e.g., $I^2C$ format) or an RS232 format. A caller identification system 58 is connected to the processor 56. The caller identification system 58 receives an identify query from the processor 50. The query can be formatted in any form that the caller ID system 58 is designed to receive, such as $I^2C$, SCSI or other. The processor sends the DTMF information to the caller ID system. The switch 50 is also intelligent enough to know to send the DTMF information to the processor. There are numerous commercial switches that perform this function for routing of phone calls (extensions) or to provide self directed options over the telephone. Once the incoming telephone call number has been identified the switch can route the call based on some predetermined criteria. For instance, calls not on a preferred list could be routed to a voice mailbox. In this embodiment the home gateway system 20 can be connected to a standard telephone line.

In one embodiment, the switch 50 allows the owners to make "intercom" type calls. When an intercom call command (e.g., dialing an internal extension) is received, the calling line is connected with another internal phone line. In another embodiment the switch acts as an electronic receptionist. The caller is given a plurality of options (e.g., users' extensions) and the switch routes the incoming call to one of the plurality of internal telephone lines based on the caller response. In one embodiment, the switch 50 upon receiving a call from the external line 52 immediately sends a message to the processor 56. The processor 56 "plays" a set of standard options or directs a voice synthesizer to perform this function. This feature is performed in essentially the same way by a variety of PBX systems.

Figure 3:
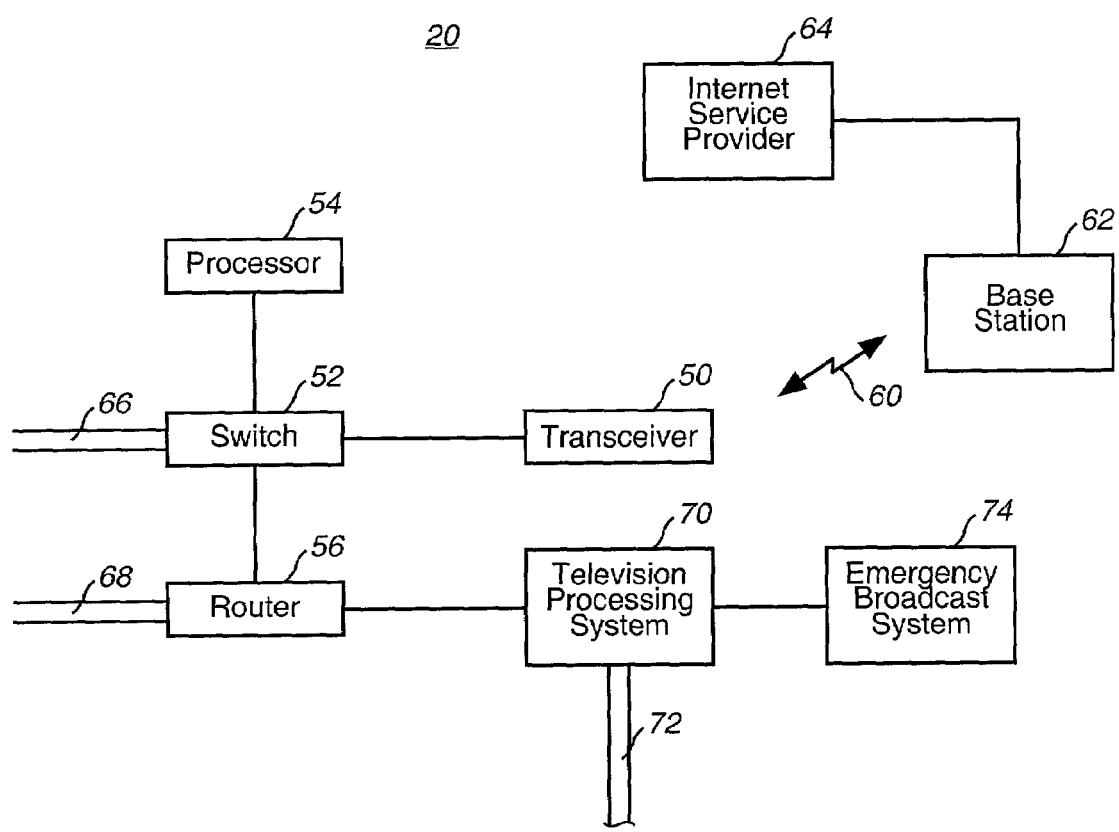
FIG. 3 is a block diagram a home gateway system in accordance with another embodiment of the invention.

FIG. 3 is a block diagram of a home gateway system 20 in accordance with one embodiment of the invention. The home gateway system has a transceiver 50 capable of establishing a telephony connection 52 with an internet service provider 34 over a wireless local loop 60. The transceiver is connected to a switch 52 (e.g., a LAN switch) having intelligence. The switch 52 is connected to a processor 54 using any number of protocols, such as $I^2C$, RS232, SS7 etc. The switch 52 is also connected to a router 56 in one embodiment. The connection between the switch and the router may be a standard ethernet connection or TCP/IP connection or any number of standard protocols. The switch 52 in one embodiment is connected to a plurality of telephones and can provide switched connections between the plurality of telephones in the house. A crossbar switch can provide physical connections between the phones and has the intelligence to switch data connections if necessary. The router 56 can be connected to a variety of data devices such as computers, printers, scanners and facsimile machines. The router 56 refers to a standard packet switched device. A data telephony connection (a data telephony connection is a telephone call over a data network such as the internet) can also be established through the router 56. In order to establish a data telephony connection, the router receives a request for an internet telephone connection from an internal port (e.g., an RJ11). The request is routed by the router through the switch 52 to the processor 54 using a protocol such as SS7. The processor 54 determines that the request requires establishing a session with an internet service provider 34. The processor 54 directs the transceiver 50 to establish a telephony connection with the internet service provider 34, by sending a command including the internet service providers telephone number to the transceiver 50. The processor 54 then establishes a communication session with the internet service provider as is standard for a dial-up connection. Once the telephony connection and session are established the telephone call proceeds normally. The voice signal is encoded into data packets for transmission over the internet. The ISP 34 upon receiving a request for a data telephony connection can route the information to an internet phone service provider. The internet phone service provider routes the call over the internet to a PSTN switch (POP point of presence) closest to the destination number. This last step is discussed in detail in other patents and will not be described herein. The PSTN switch routes the last part of the call in a standard manner.

The router, upon receiving a data packet from an internal port (internal port means a port inside the house) with an external address, sends a request to the processor to establish a communication session. The processor directs the transceiver to establish a telephony connection with an internet service provider (ISP). The processor 54 sends an electronic message to the transceiver that includes the telephone number of the ISP using a standard buss protocol to the switch 52 (e.g., RS232, SCSI, etc) and the switch forwards the message using a standard LAN protocol in one embodiment. This process is the similar to a cell phone owner pushing button to dial a stored telephone. Once the communication session is established data packets are routed to the ISP.

Figure 4:
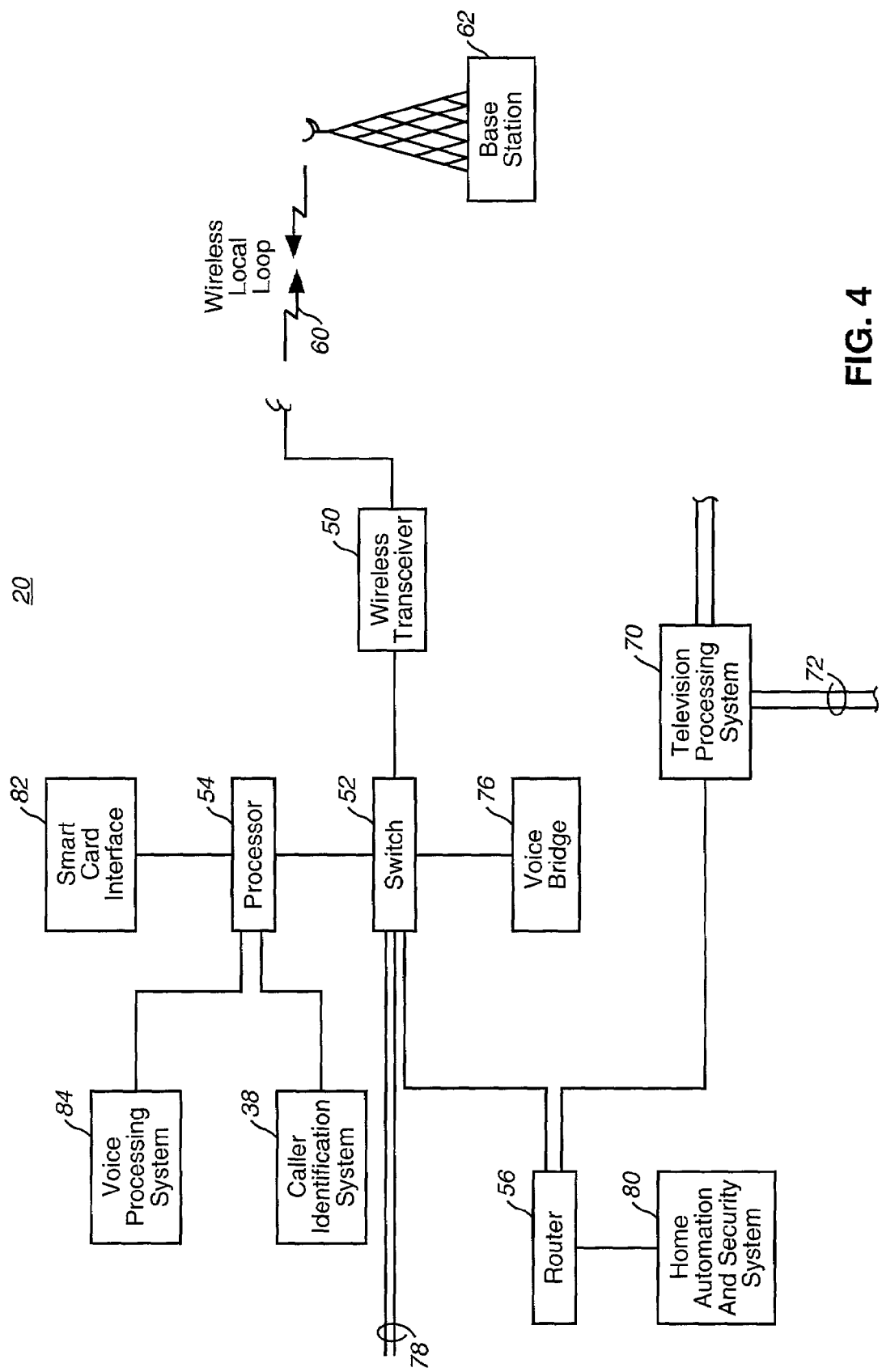
FIG. 4 is a block diagram a home gateway system in accordance with another embodiment of the invention.

FIG. 4 is a block diagram of a home gateway system 20 for home automation and security in accordance with one embodiment of the invention. In this embodiment the transceiver 50 establishes a wireless local loop connection 60 with a base station 62. A wireless local loop is a telephony connection between the PSTN (telephony network) and a subscriber's home. The wireless local loop is an alternative to a standard wired local loop connection. A single base station 62 will generally cover an entire neighborhood. In one embodiment the base station 62 to subscriber link is a point to multipoint (broadcast) link. The link from the subscriber's house to the base station 62 is a point to point link. These links are not mobile links, but geographically stable. This simplifies the processing of a wireless local loop compared to a mobile (cellular, PCS) telephone link and allows for lower cost, higher quality telephone links. The transceiver 50 is connected to a switch 52 over a bus such as SCCI, PCI or I$^2$C. The switch 52 is connected to a voice bridge 76, a processor 54 and a router 56. The switch may be similar to a LAN switch having intelligence and a switching system such as a cross bar switch, a shared memory switch or a high speed bus switch. The protocol between the processor and the switch may be ethernet, SS7, RS232 or other protocols. The protocol between the voice bridge and the switch may be ethernet, RS232, SS7, or a standard computer protocol (PCI). The switch 52 also has a plurality of input lines 78. Telephones, facsimile machines and modems are among the devices that can be connected by the input lines 78 to the switch 52. Note that analog devices may require a A/D (analog to digital converter) CODEC in order to connect to the switch. If the switch technology is a crossbar switch this will not be necessary. The router 56 is a standard packet switch and allows a user to establish a local area network within his home. The router 56 is connected to the switch 50 using a standard ethernet or packet switched communication system. The router 56 in this embodiment is connected to a television processing system 70 and a home automation and security system 80. The router 56 uses a standard packet switched protocol to communicate with the home automation and security system and the television processing system. Note that it may be necessary for the router to convert between different communication protocols. For instance it may be necessary for the router to convert between ethernet and TCP/IP. The processor 54 is connected to a smart card interface 82 using a standard bus architecture such as SCCI, PCI, RS232, VME, etc. The smart card interface is used as a keyless entry and to store certain home automation setups. A voice processing system 84 is connected to the processor 54 over a standard buss such as SCCI, PCI, VME, etc. The voice processing system 84 includes voice verification and speech recognition capabilities. The voice verification capability is used for remote access to the home automation and security system or is used for keyless entry. A caller identification system 58 is connected to the processor 54 over a standard buss such as PCI, SCCI, VME, etc. The caller identification system 58 can be used as part of a remote access screening.

The smart card interface 82 is used to store and download (setup instructions) various user preferences or setups. The voice processing system 84 includes a complete voice mail system and a voice recognition and speech synthesis system. The voice processing system 84 in combination with the switch acts as an electronic receptionist for an incoming phone call. In addition, the voice processing system is used for voice activated dialing. The caller identification system 58 logs incoming calls and is used for call screening. In one embodiment all calls not on a preferred list are routed to the voice mail of the voice processing system 84. This requires the switch 52 to query the processor 54 on how to route incoming calls. This query process is similar to a SSP sending a query to a SCP in an intelligent network. The switch is programmed to trigger on certain requests and send a query to the processor. The voice bridge 76 is used to setup three way calls (conference calls).

The home automation and security system 80 can send messages through the router 56 to a computer, television processing system 70 or have the wireless transceiver 70 place a call to emergency personnel. The television processing system 70 receives a plurality of television signals from a cable. The smart card interface 82 is used to setup the various appliances and to turn on or off lights. A user can call in commands to the home automation and security system 58 by using the speech recognition technology of the voice processing system 84. The voiced command is recognized and converted into a data command that the home automation and security system 80 understands. In one embodiment the user's voice is authenticated by a speaker recognition system in the voice processing system 84, before a voiced command will be obeyed.

Figure 5:
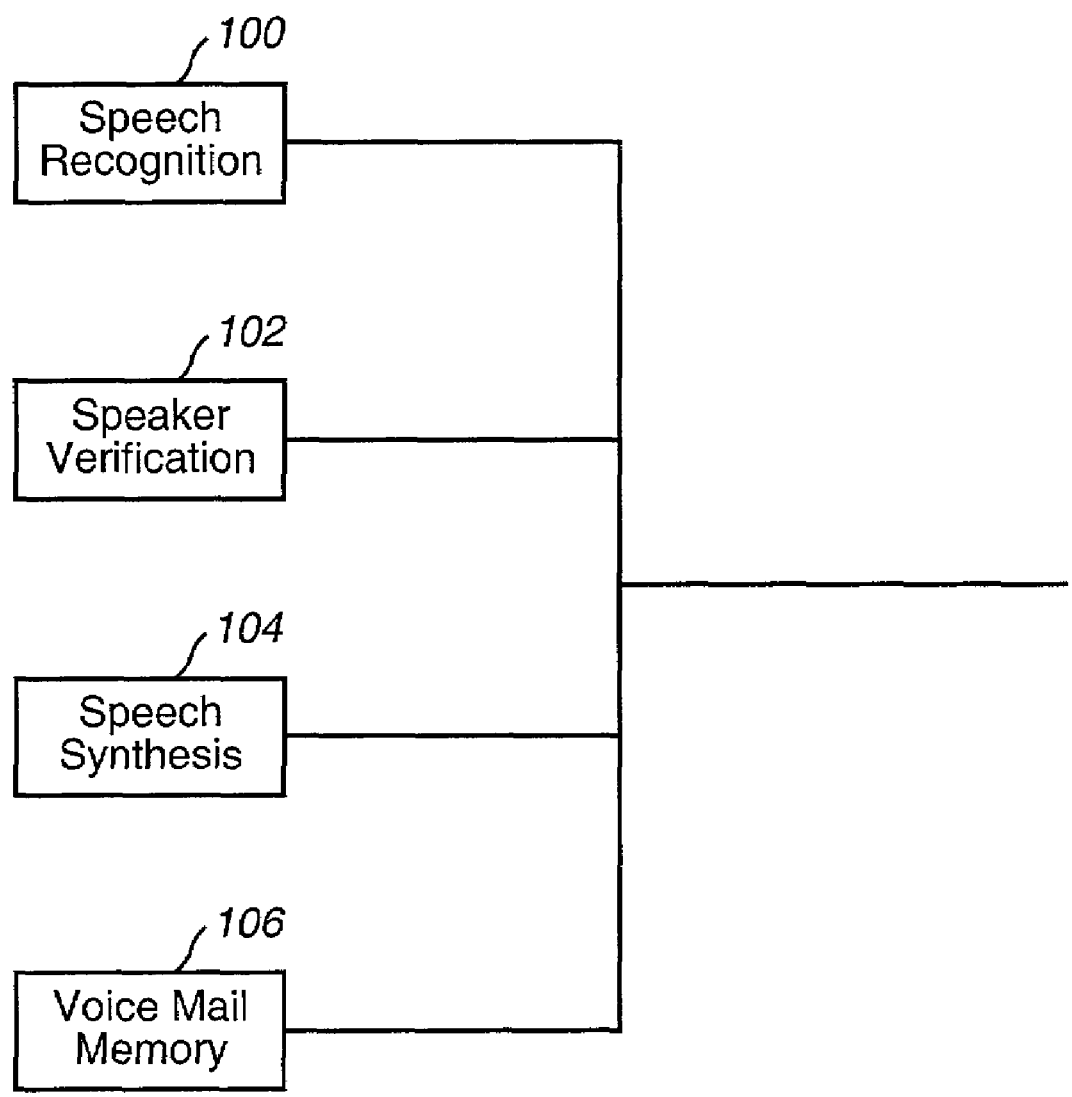
FIG. 5 is a block diagram of a voice processing system used in a home gateway system in accordance with one embodiment of the invention.

FIG. 5 is a block diagram of a voice processing system 84 used in a home gateway system with telephony functions in accordance with one embodiment of the invention. The voice processing system 84 contains a speech recognition system 100, a speaker verification system 102, a speech synthesis system 104 and a voice mail memory system 106. The control of the systems of the voice processing system 84 is performed in one embodiment by the processor 54. The processor 54 coordinates the voice system 100-106 to provide machine reception for remote access to the home security system and voice mail capabilities for instance. Note that the voice processing system's functions may be implement in firmware and run on a microprocessor or DSP in combination with memory.

Figure 6:
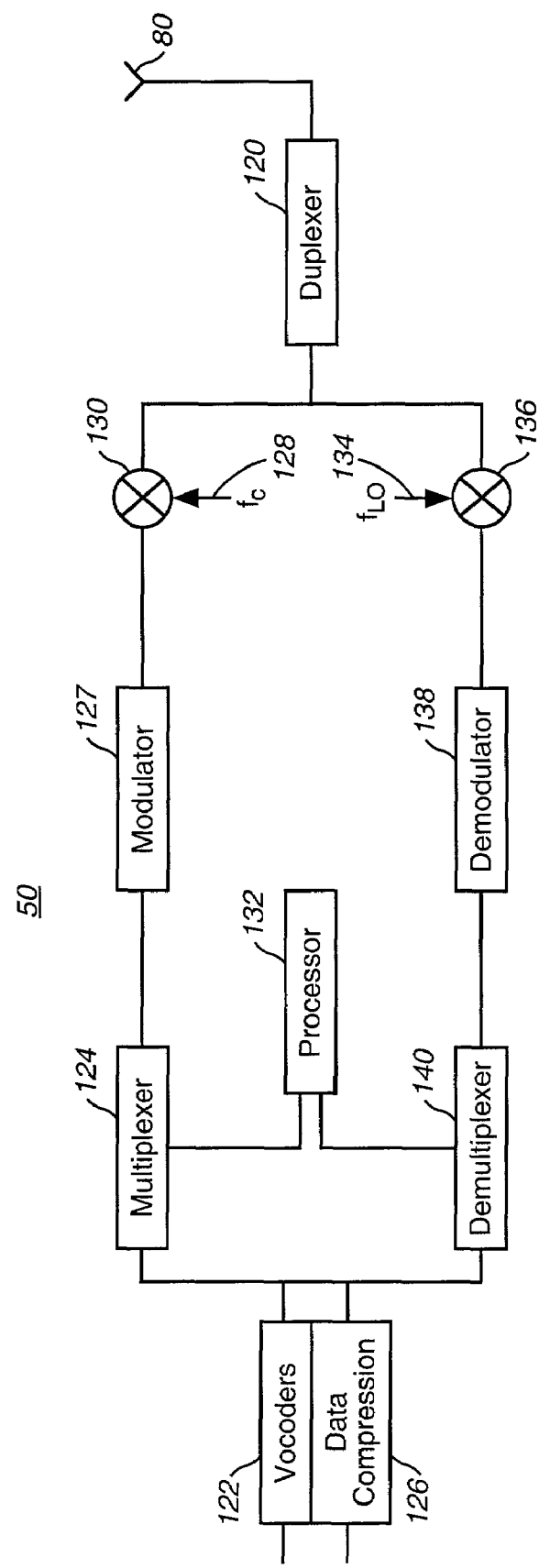
FIG. 6 is a block diagram of a transceiver used in a home gateway system in accordance with the one embodiment of the invention.

FIG. 6 is a block diagram of a transceiver 50 used in a home gateway system with telephony functions in accordance with the one embodiment of the invention. The transceiver 50 has a duplexer 120 that isolates the incoming signals from the outgoing signals based on their frequencies. Outgoing analog voice signals are first encoded by a vocoder 122 in one embodiment. The vocoder 122 converts the analog voice signal to a digital voice signal. Some outgoing signals will be digital signals, if for instance the user is using a digital cordless telephone in the house. Digital voice signals will generally be passed on to the multiplexer 124, however in some circumstances a data compression circuit 126 compresses the digital voice signal. When the signal is a data signal it may also be compressed. All the outgoing signals are then multiplexed together by the multiplexer 124. The multiplexer 124 in one embodiment time division multiplexes the outgoing signals. In another embodiment, the multiplexer 124 wavelength division multiplexes the outgoing signals. In another embodiment, the multiplexer 124 code division multiplexes the signals. The particular multiplexing scheme that is used depends on the requirements of the wireless local loop. The modulator 127 then modulates the outgoing signals. Then the outgoing signals are up converted by a carrier signal 128 at a mixer 130. A processor 132 controls the multiplexer 124 and receives certain control information.

The incoming signals are first down converted by a local oscillator signal 134 at the mixer 136. The incoming signals are then demodulated (demodulated output) by a demodulator 138. A demultiplexer 140 then demultiplexes the incoming signals. When the incoming signals are compressed, they are expanded by the data compression circuit 126. When a digitized voice signal needs to be converted to an analog voice signal, the vocoders 122 perform this function. The incoming signals are then passed to the switch.

Figure 7:
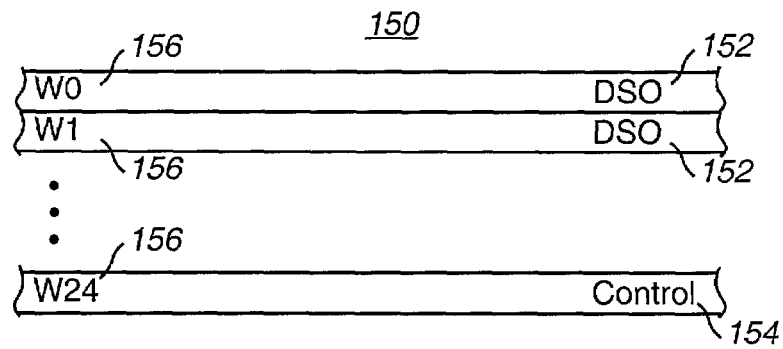
FIG. 7 is a schematic diagram of a wavelength division multiplexing scheme used in a home gateway system in accordance with one embodiment of the invention.

FIG. 7 is a schematic diagram of a wavelength division multiplexing scheme 150 used in a home gateway system in accordance with one embodiment of the invention. The diagram shows a plurality of wavelength division multiplexed channels 152 and a control channel 154 carried by separate wavelengths (frequencies) W0 through W24 156.

Figure 8:
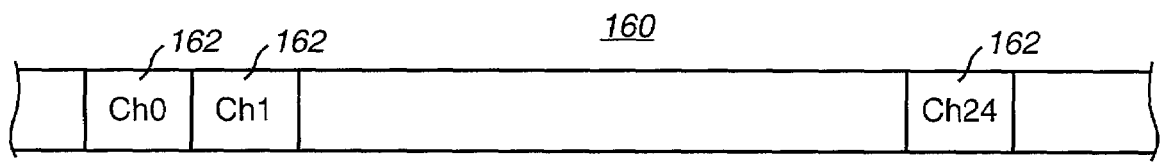
FIG. 8 is a schematic diagram of a time division multiplexing scheme used in a home gateway system in accordance with one embodiment of the invention.

FIG. 8 is a schematic diagram of a time division multiplexing scheme 160 used in a home gateway system in accordance with one embodiment of the invention. The diagram shows a plurality of time division multiplexed channels (ch0, ch1, ... ch24) 162 carried at different time slots ($T_0$, $T_1$, ... $T_{24}$).

Figure 9:
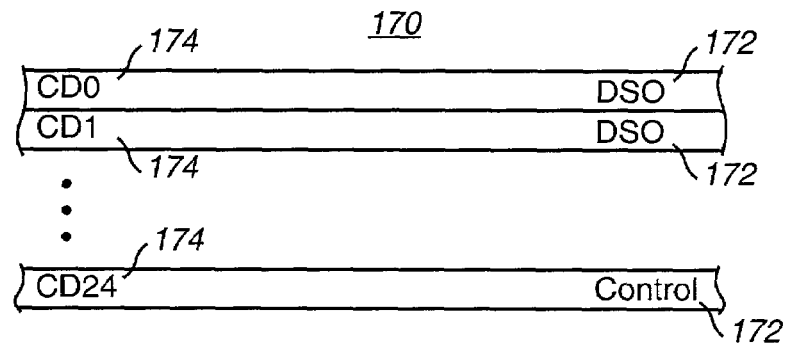
FIG. 9 is a schematic diagram of a code division multiplexing scheme used in a home gateway system in accordance with one embodiment of the invention.

FIG. 9 is a schematic diagram of a code division multiplexing scheme 170 used in a home gateway system in accordance with one embodiment of the invention. The diagram shows a plurality of channels 172 carried on different codes (CD0, CD1 ... CD24) 174. The codes are used to modulate the channels and the channels can be recovered by demodulating with the appropriate codes. Commonly the wireless local loop would have two to four voice channels and a control channel.

Figure 10:
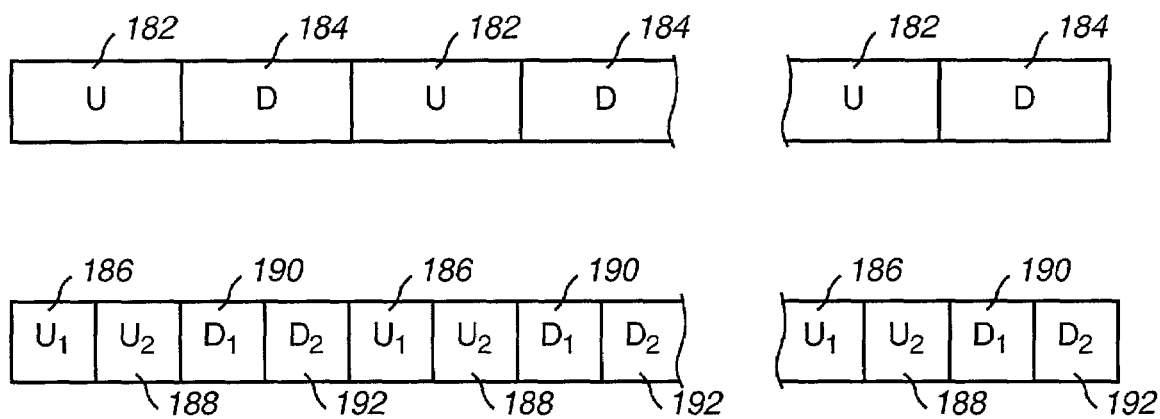
FIG. 10 is a schematic diagram of a derive lines scheme used in a home gateway system in accordance with one embodiment of the invention.

FIG. 10 is a schematic diagram of a derive lines scheme 180 used in a home gateway system in accordance with one embodiment of the invention. In one embodiment, the wireless local loop supports two telephone lines. When both telephone lines are in use, the derive lines technique can divide one of the lines in two and create three lines or the total bandwidth can be reallocated among the three lines. In the embodiment shown in FIG. 10, an up-link line 182 transmits for a time slot. The down link channel 184 also transmits for one time slot. The derive lines scheme compresses the existing signal by a factor of ½ and also compress the new signal by ½. Then the up-link time slot is divided in half, so that there is a first uplink time slot 186 and a second uplink time slot 188. The downlink time slot is also divided in half, so that there is a first downlink time slot 190 and a second downlink time slot 192. While the derived line scheme is described in conjunction with a time division-multiplexing scheme, it can also be implemented with a wavelength division multiplexing scheme or a code division-multiplexing scheme. When the term "derived line" or "derived digital lines" is used in this application including the claims, it means the process as described above or variation that would be obvious to those skilled in the art.

Figure 11:
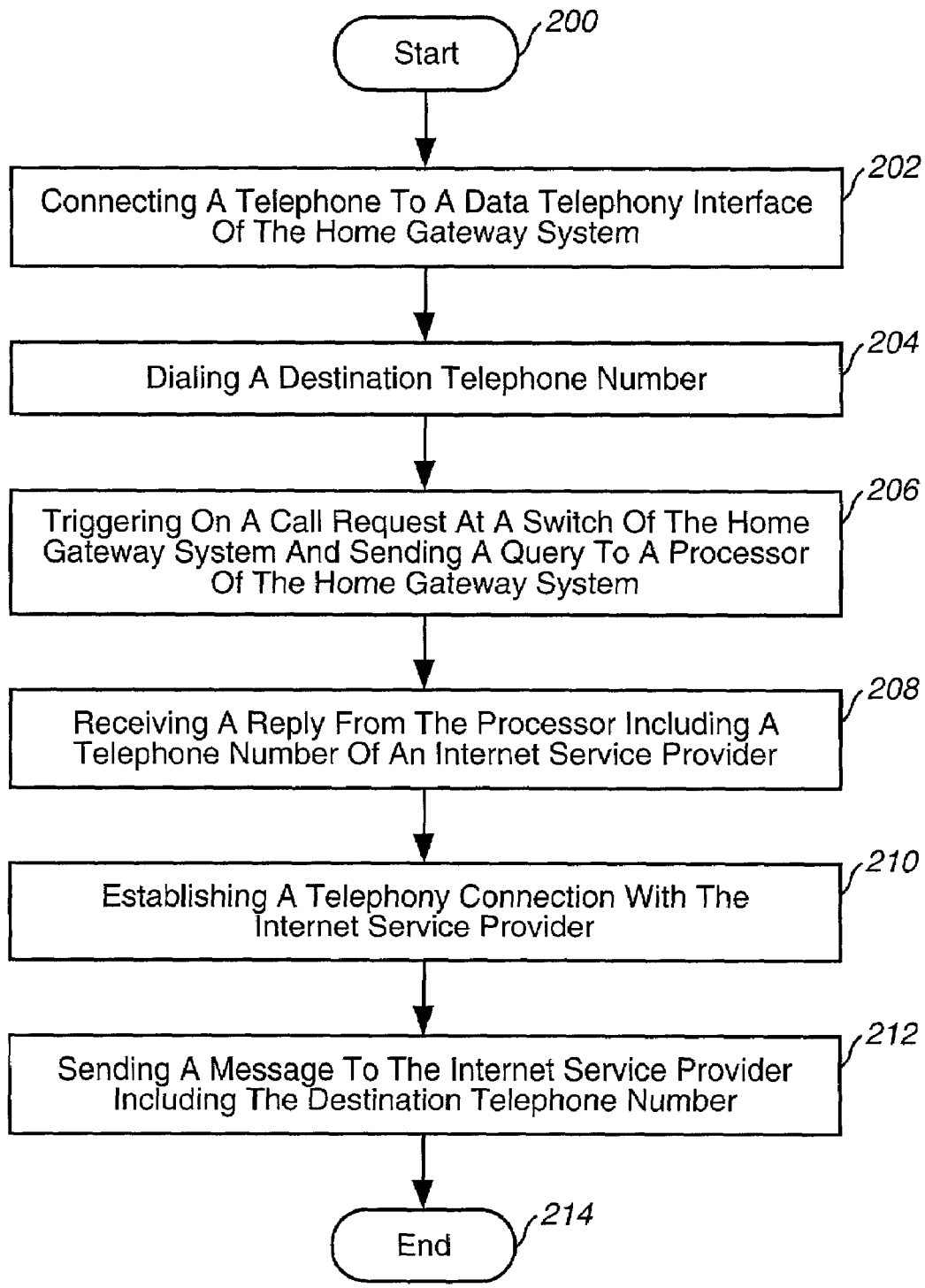
FIG. 11 is a flow chart of a method of operating a home gateway system to provide a data telephony connection in accordance with one embodiment of the invention.

FIG. 11 is a flow chart of a method of operating a home gateway system to provide a data telephony connection in accordance with one embodiment of the invention. The process starts, step 200, by connecting a telephone to a data telephony interface of the home gateway system at step 202. Note that the phrase "data telephony interface" is a standard telephony jack (RJ11) that may be used to connect through the router for a data telephone call. Next, a destination telephone number is dialed at step 204. A switch of the home gateway system triggers on a call request and sends a query to a processor of the home gateway system at step 206. This is similar to a SSP triggering on a call and sending query to a SCP in an intelligent telephone network. A reply is received from the processor that includes a telephone number of an internet service provider at step 208. At step 210 a telephony connection is established with the internet service provider. A message is sent to the internet service provider that includes the destination telephone number at step 212, which end the process at step 214.

In one embodiment step 210 of establishing a telephony connection includes establishing a wireless local loop connection to a base station. The base station connects the call to the internet service provider.

Figure 12:
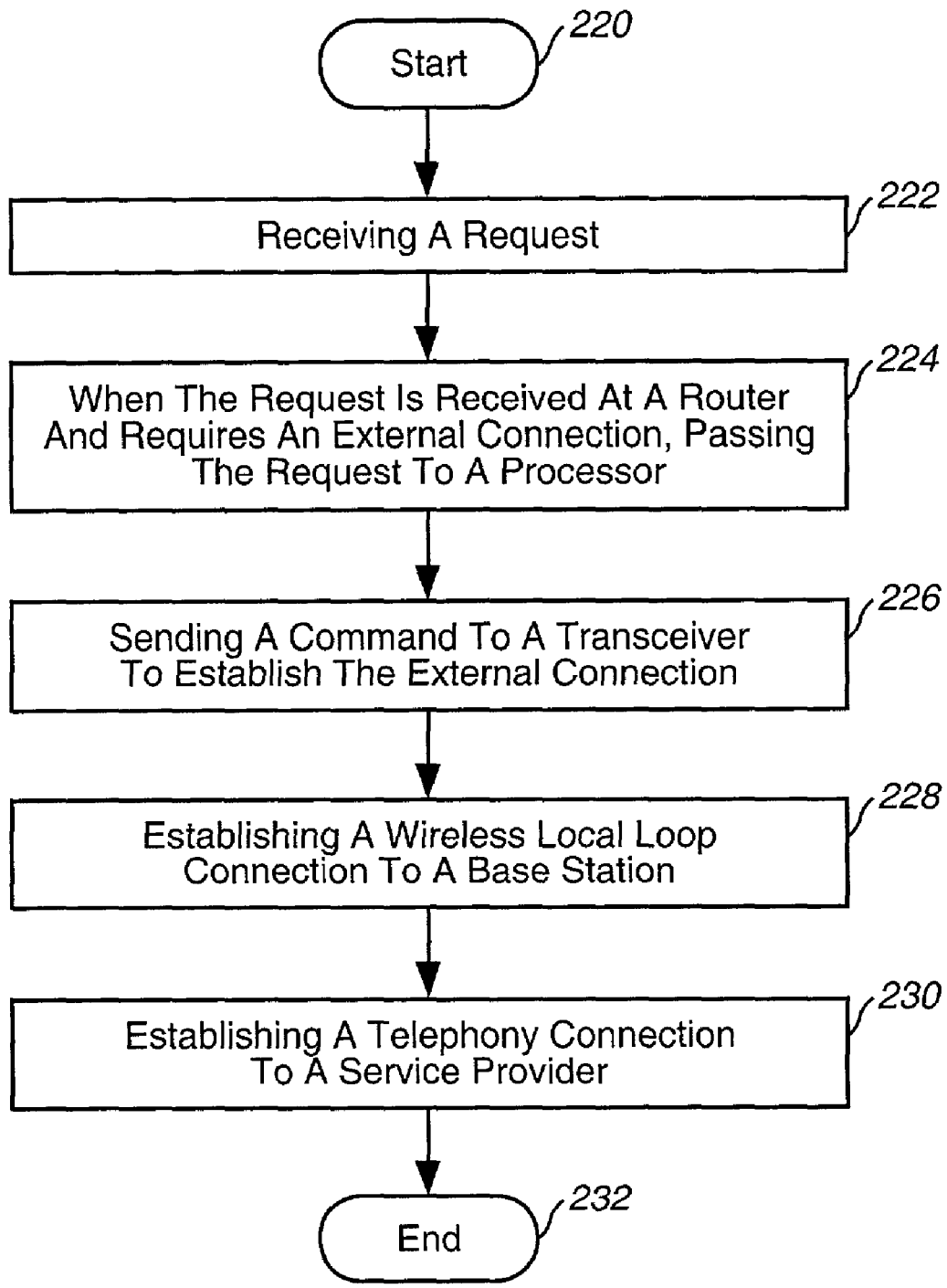
FIG. 12 is a flow chart of a method of operating a home gateway system to provide a data telephony connection in accordance with another embodiment of the invention.

FIG. 12 is a flow chart of a method of operating a home gateway system to provide a data telephony connection in accordance with another embodiment of the invention. The process starts, step 220, by receiving a request at step 222. When the request is received at a router and requires an external connection, the request is passed to a processor at step 224. Note that this is similar to SSP sending a query to a SCP in an intelligent telephone network. A command is sent to a transceiver to establish an external connection at step 226. At step 228 a wireless local loop connection to a base station is established. A telephony connection to a service provider is established at step 230, ending the process at step 232.

In one embodiment the step 226 includes an asymmetrical data service indicator. In this case the transceiver establishes an asymmetrical data link (ASDL or DSL) with the base station. ASDL can be particularly advantageous when the user is surfing the World Wide Web. ASDL divides the bandwidth of a telephone line(s) into a low bandwidth channel from the home to the ISP and a high bandwidth channel from the ISP to the home. This allows large amounts of graphical data to be downloaded to the user quickly.

In another embodiment after the telephony connection to the service provider is established, a plurality of data packets are received for transmission over the external connection. The priority of the plurality of data packets is determined either by the processor or the switch. Those data packets having a high priority (high priority data packets) are sent before any low priority data packet are transmitted. The low priority packets have to be buffered and sent later. In another embodiment the low priority data packets are compressed to form a plurality of compressed data packets. The compressed data packets are then multiplexed with the high priority data packet over the external connection.

In another embodiment the request is an information service provider request. The request can be for traffic, weather, travel or other information stored on a web site. The information may come from the internet or a telephone information system. The user can request this information through his television and in this case the received information is displayed on a channel of his television. The user can also request this information from his computer or his telephone and in that case the information is sent back to the device originating the request. Using the voice processing system it is possible to convert data to voice or voice to data so that any information source can be translating into the appropriate form for the requesting device.

Figure 13:
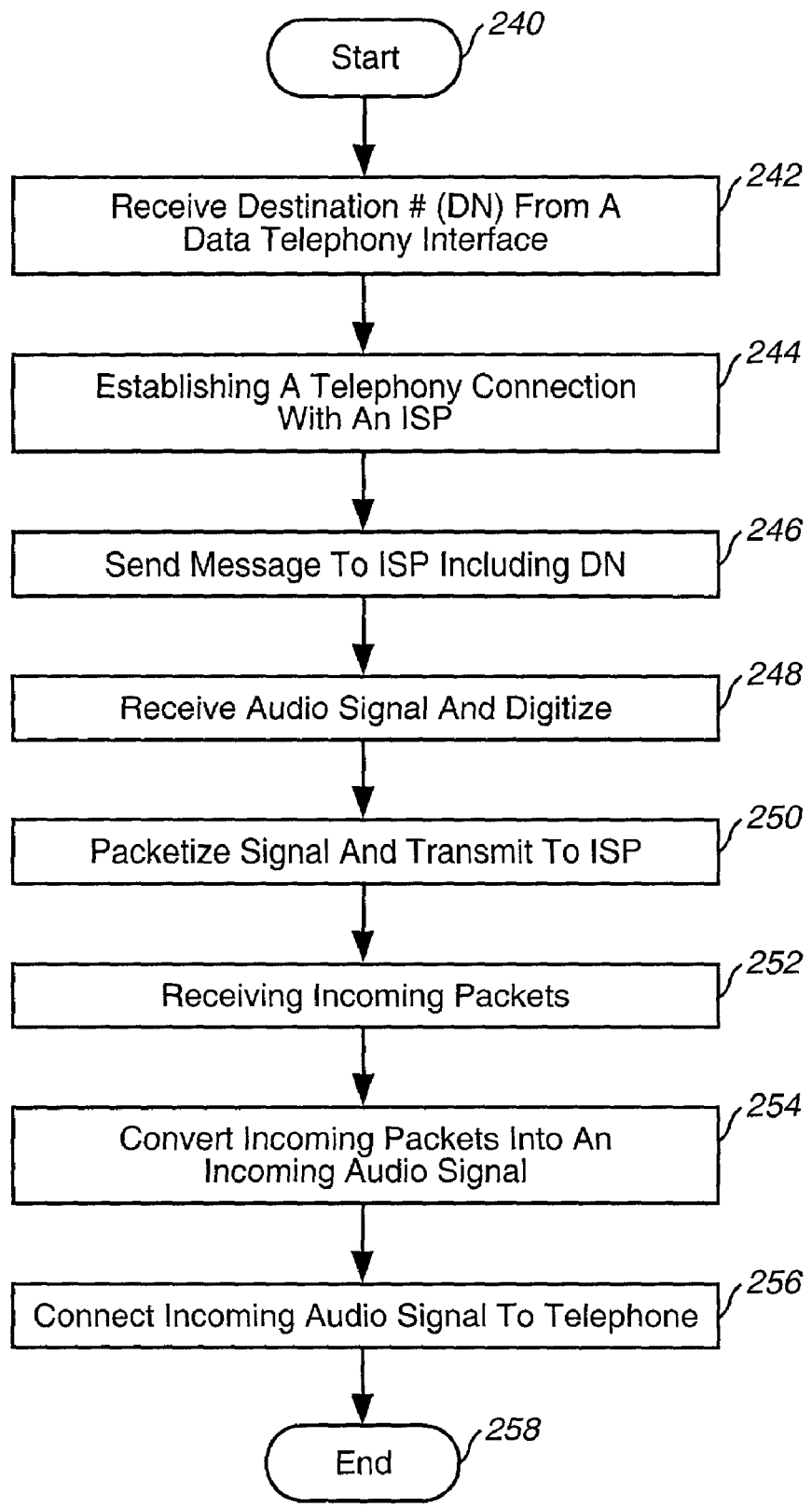
FIG. 13 is a flow chart of a method of operating a home gateway system to provide a data telephony connection in accordance with another embodiment of the invention.

FIG. 13 is a flow chart of a method of operating a home gateway system to provide a data telephony connection in accordance with another embodiment of the invention. The process starts, step 240, by receiving a destination number from a data telephony interface at step 242. Note that a "data telephony interface" is a standard telephone jack (RJ11) that designates a "data telephone" call is desired. A data telephone call is a telephone call over a data network such as the internet. A telephony connection with an ISP is established at step 244. A message is then sent to the ISP that includes the destination number (DN) at step 246. An audio signal is received and digitized by the home gateway system at step 248. In one embodiment the signal is also compressed. The digitized signal is then packetized to form a plurality of outgoing packets and transmitted to the ISP at step 250. In one embodiment the packets have an associated priority and high priority packets are transmitted first. The home gateway receives incoming packets (plurality of incoming packets) at step 252. The incoming packets are converted into an incoming audio signal (digital or analog) at step 254. The incoming audio signal is sent to the telephone at step 256 that ends the process at step 258.

Figure 14:
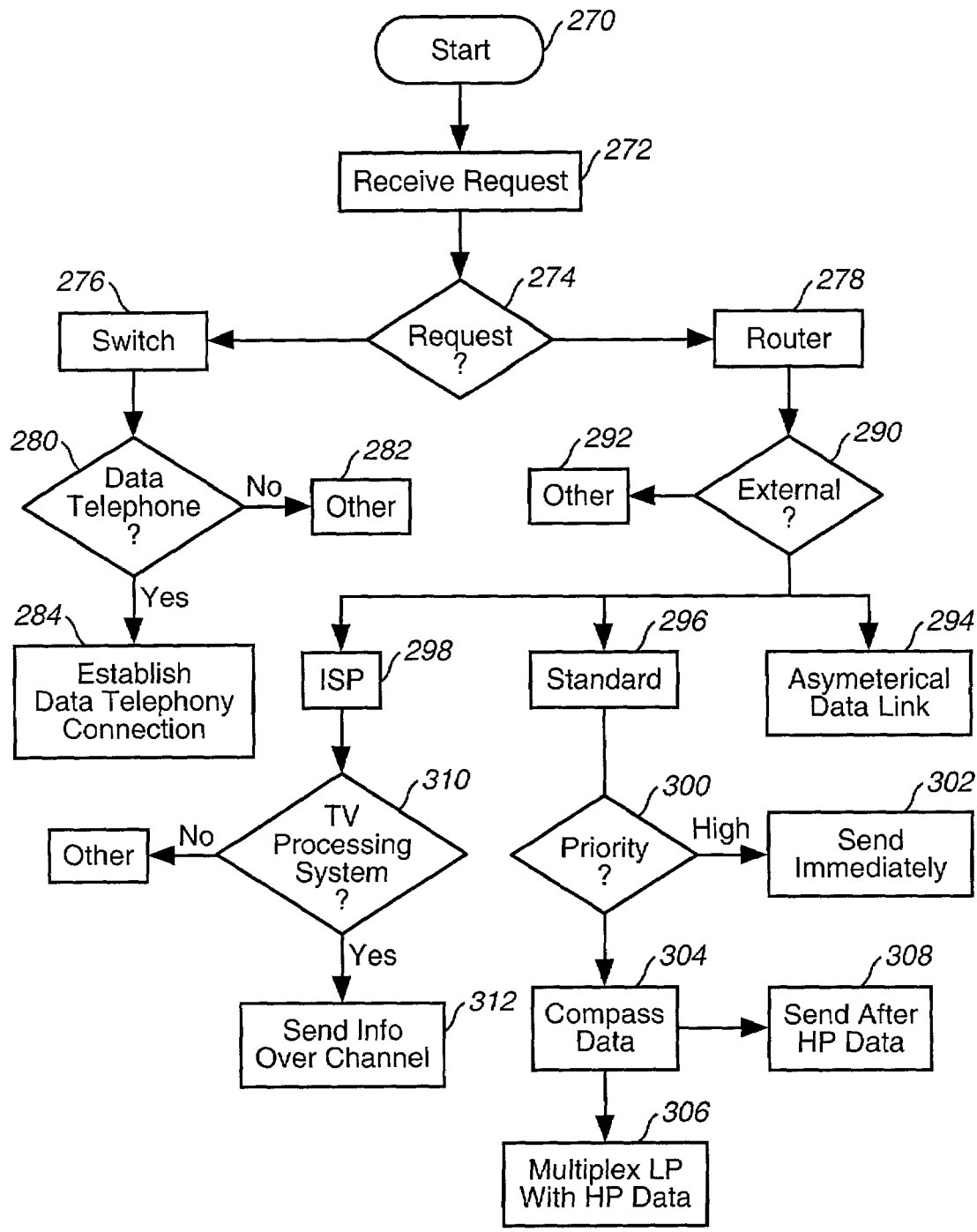
FIG. 14 is a flow chart of a method of operating a home gateway system in accordance with one embodiment of the invention.

FIG. 14 is a flow chart of a method of operating a home gateway system in accordance with one embodiment of the invention. The operation starts, step 270, when a request is received at step 272. At step 274, it is determined if the request is for a switch 276 or a router 278. When the request is for a switch 276, it is determined if the request is for a data telephony connection at step 280. When the request is not for data telephony connection, other standard switch processing is performed at step 282. Standard switch processing can include internal routing of phone calls or routing to the voice messaging system for instance. When the request is for a data telephony connection it is established at step 284.

When a request was for a router 278, it is determined if the request requires an external connection at step 290. When the request does not require an external connection, standard routing functions are performed at step 292. Standard routing functions include passing data between computers, computers and printers or fax machines for instance. When the request requires an external connection, it is determined if the request is for an asymmetrical data link 294, or a standard link 296 or an ISP information service 298. When the request is for an asymmetrical data link (ASDL), the transceiver establishes an ASDL link with an ISP. When the request is for a standard link, a priority of the data to be sent is determined at step 300. When the priority is high, the data is sent immediately at step 302. When the priority is not high, the data is compressed at step 304. The low priority data is multiplexed with the high priority data at step 306. In another embodiment, the low priority data is stored until all the high priority data has been sent and then sending the low priority data at step 308. When the request is for an ISP 298, it is determined if the request is for a TV processing system 310. When the request is for the TV processing system, channel information is sent at step 312. When the request is not for the TV processing system, other processing is provided at step 314.

Figure 15:
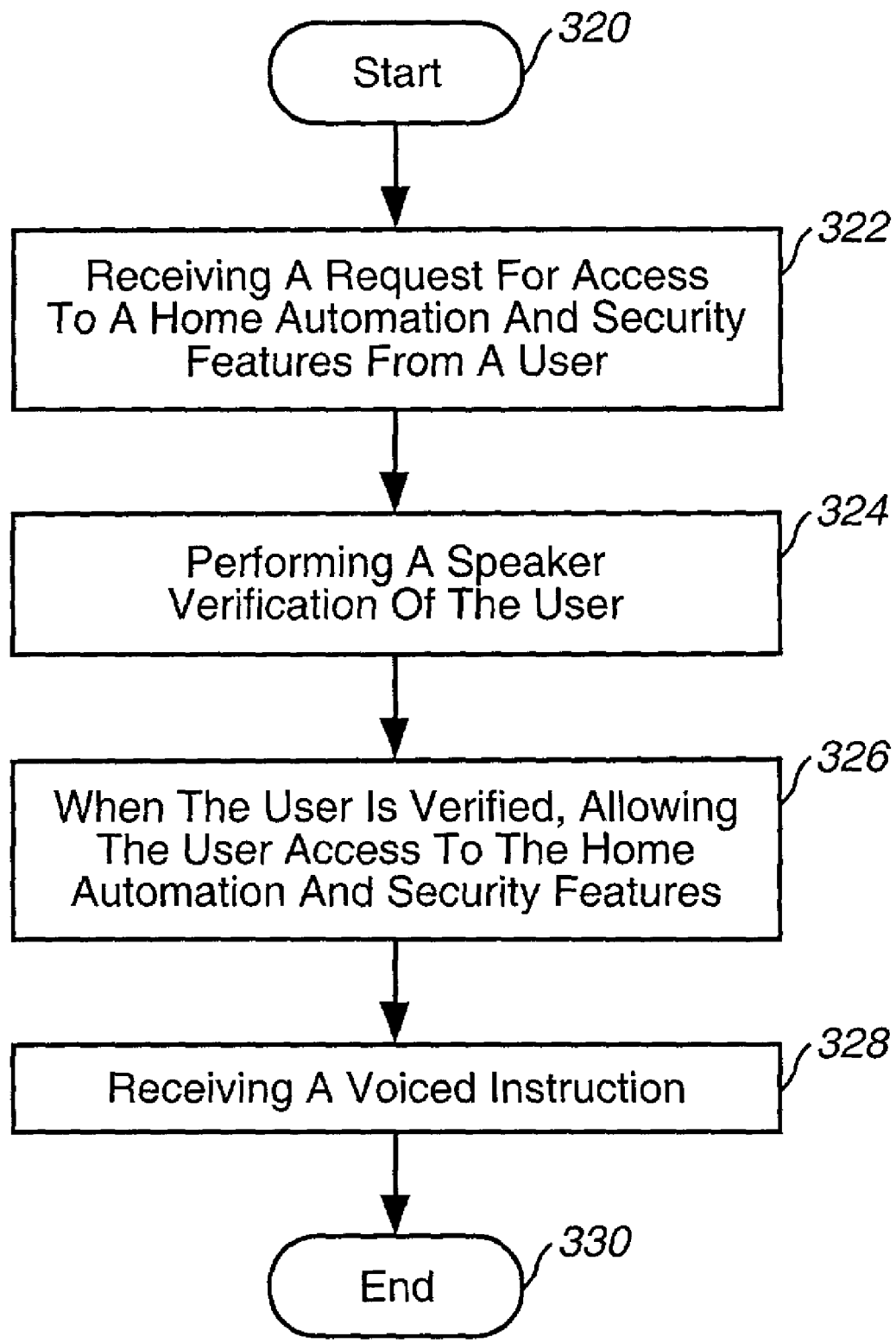
FIG. 15 is a flow chart of the steps used in a home gateway system for home automation and security in accordance with one embodiment of the invention.

FIG. 15 is a flow chart of the steps used in a home gateway system for home automation and security in accordance with one embodiment of the invention. The process starts, step 320, by receiving a request for access to a home automation and security features from a user at step 322. A speaker verification of the user is performed at step 324. When the user is verified, the user is allowed access to the home automation and security features at step 326. At step 328, a voiced instruction is received which ends the process at step 330.

In one embodiment, the step of receiving a request for access to the home automation and security features further includes inputting an electronic address of the home gateway system. Next, an electronic connection is established with the home gateway system. The user is then presented with a plurality of options including the home automation and security features. In one embodiment dialing a phone number performs the step of entering the electronic address. In another embodiment the electronic connection is a wireless local loop telephony connection.

In yet another embodiment the electronic connection is an internet connection and the user clicks on the home automation and security features option. The internet connection can be carried over the wireless local loop or over the cable TV link.

In one embodiment the speaker verification step further includes requesting a user to speak an access code. The access code is recognized using speech recognition. When the access code is valid and belongs to a set of approved access codes, speaker verification is performed. When the speaker verification fails, the user is requested to enter a personal identification number. When the personal identification is valid, the user is allowed access to the home automation and security features. When the personal identification is not valid the user is denied access to the home automation and security features.

In a further embodiment the voiced instruction is recognized using the speech recognition system. The recognized instruction is converted into an electronic instruction that the home automation and security system can understand. The electronic instruction is then sent to the home automation and security controller.

Figure 16:
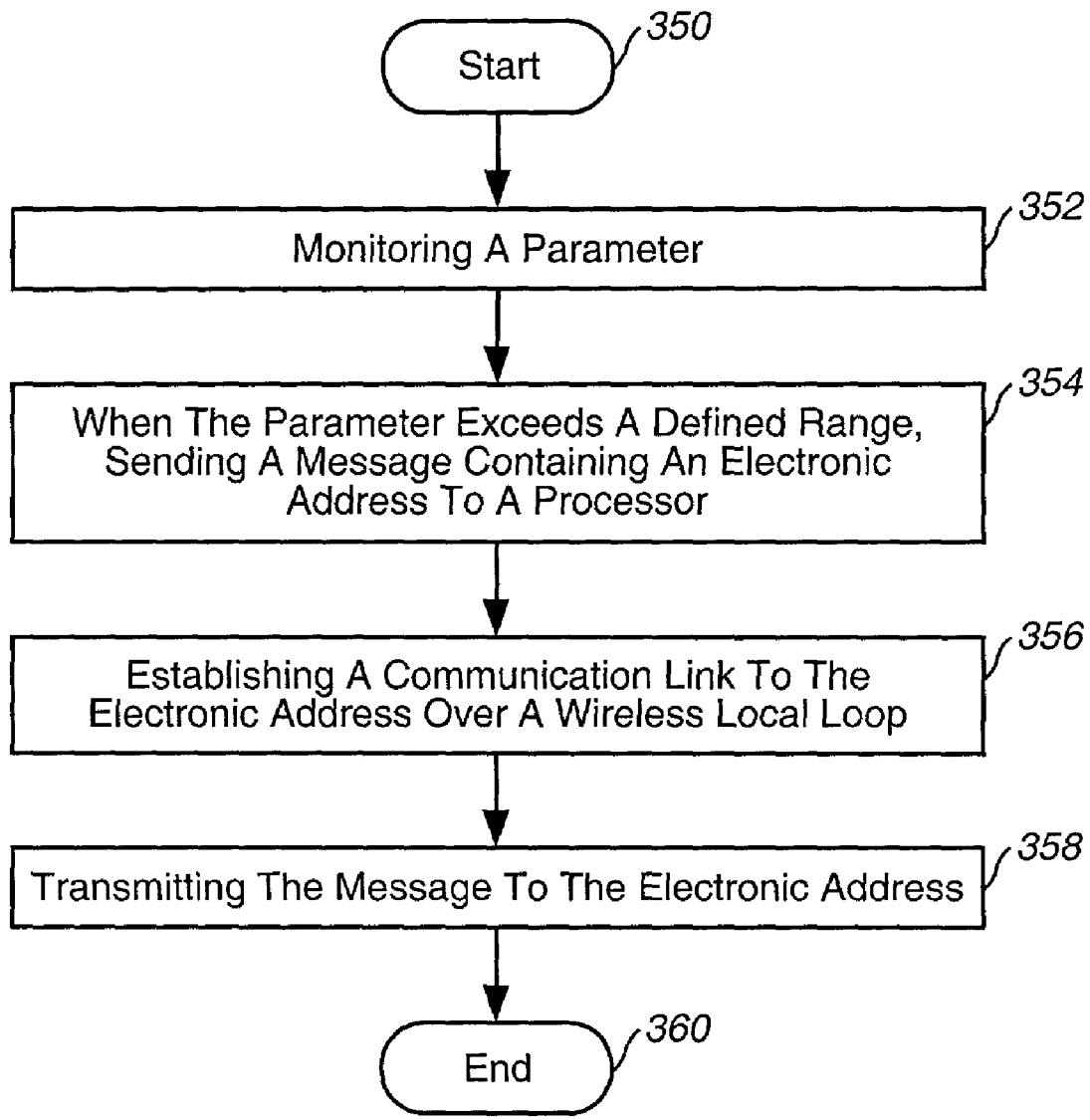
FIG. 16 is a flow chart of the steps used in a home gateway system for home automation and security in accordance with another embodiment of the invention.

FIG. 16 is a flow chart of the steps used in a home gateway system for home automation and security in accordance with another embodiment of the invention. The process starts, step 350, by monitoring a parameter at step 352. When the parameter exceeds a defined range, a message is sent containing an electronic address to a processor at step 354. A communication link to the electronic address is established over a wireless local loop at step 356. At step 358 the message is transmitted to the electronic address, which ends the process at step 360.

In one embodiment the parameter is a forceful entry signal and the message contains a police telephone number. In another embodiment a portion of the message is speech synthesized to form an audio message. The audio message is transmitted to the electronic address. For instances, the audio message could include the street address of house and which sensor was tripped. In addition, the message could tell the police if the owners are home.

In another embodiment the message includes an internet address of the police. A message is sent to a police computer and includes the street address of house and which sensor was tripped. In yet another embodiment the parameters monitored can be an appliance. The data points for the parameter can be sent over the internet to the owner at a remote location. This would allow a homeowner to determine if a sprinkler was left on or the furnace had quit working.

Figure 17:
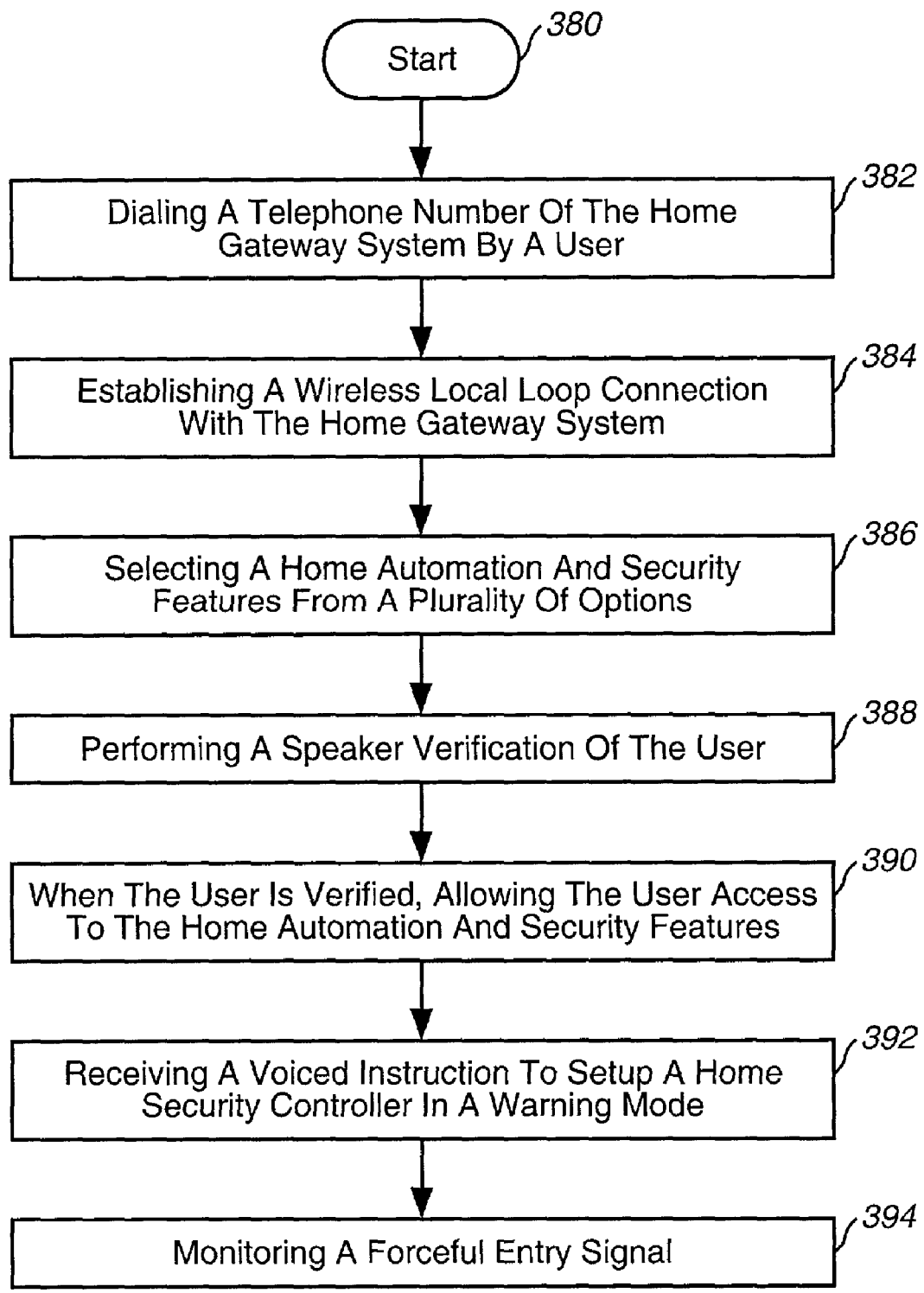
FIGS. 17 & 18 are a flowchart of the steps used in a home gateway system for home automation and security in accordance with another embodiment of the invention.
Figure 18:
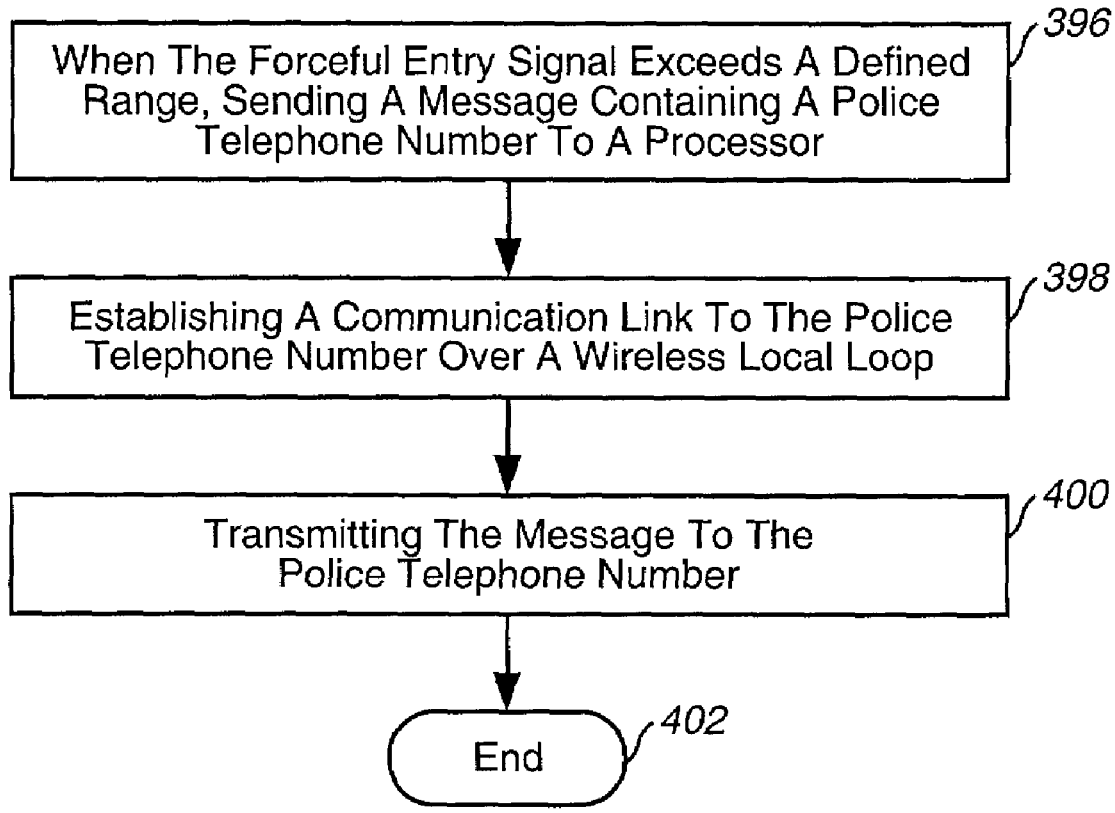

FIGS. 17 & 18 are a flowchart of the steps used in a home gateway system for home automation and security in accordance with another embodiment of the invention. The process starts, step 380, by the user dialing a telephone number of the home gateway system at step 382. A wireless local loop connection is established with the home gateway step at step 384. The user then selects the home automation and security features from a plurality of options at step 386. Speaker verification is performed of the user at step 388. When the user is verified, the user is allowed access to the home automation and security features at step 390. A voice instruction is received from the user to setup the home security controller in a warning mode at step 392. A forceful entry signal is monitored at step 394. When the forceful entry signal exceeds a defined range, a message containing a police telephone number is sent to a processor at step 396. A communication link to the police telephone number is established over wireless local loop at step 398. At step 400, the message is transmitted to the police telephone number, which ends the process at step 402.

Figure 19:
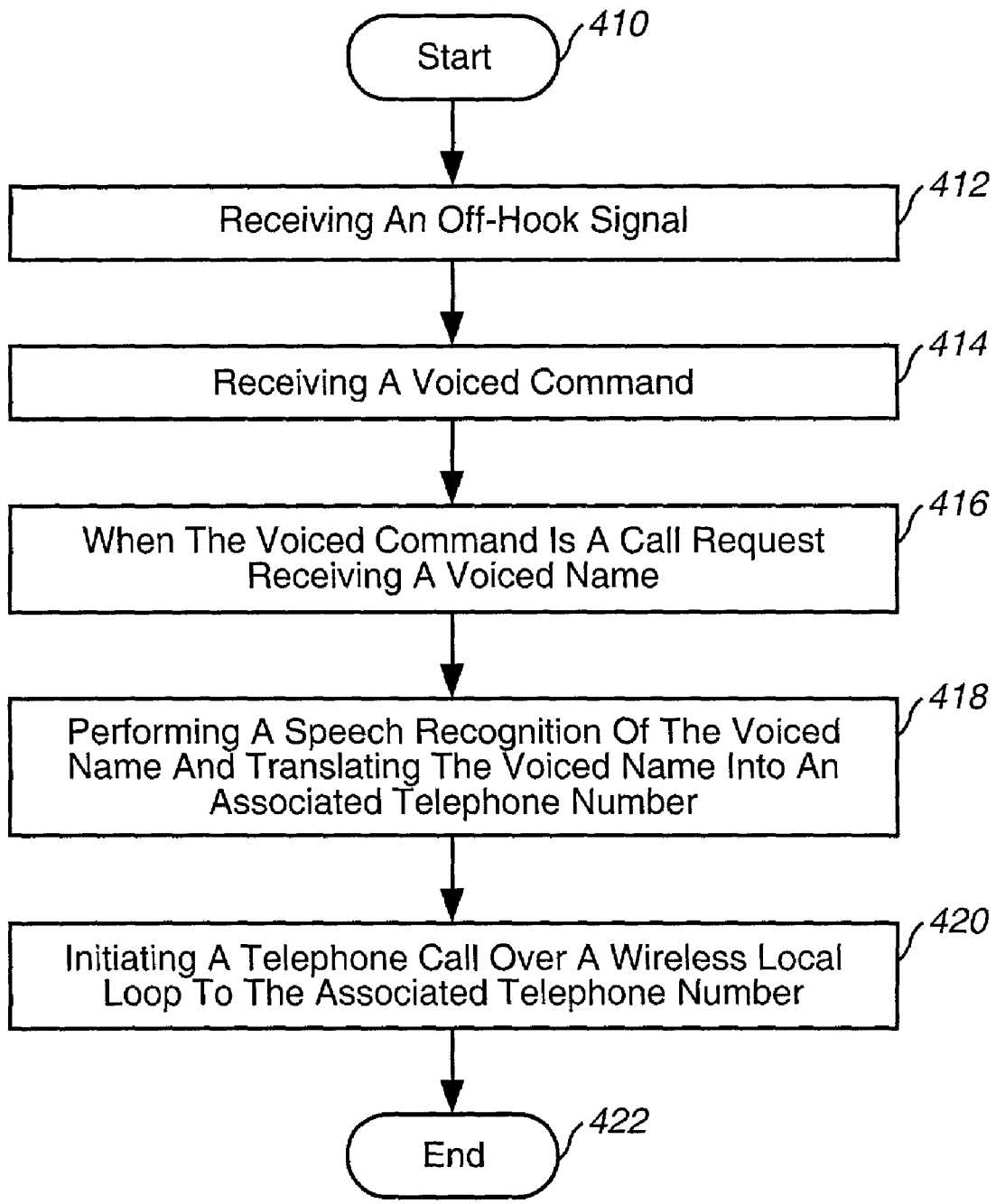
FIG. 19 is a flow chart of a process of voice dialing used in a home gateway system in accordance with one embodiment of the invention.

FIG. 19 is a flow chart of a process of voice dialing used in a home gateway system in accordance with one embodiment of the invention. The process starts, step 410, by receiving an off-hook signal at step 412. Next, a voice command is received by the home gateway system at step 414. When the voice command of step 414 is a call request, a voiced name is received at step 416. A speech recognition process is performed on the voiced name and the recognized name is matched with an associated telephone number at step 418. At step 420 the home gateway system initiates a telephone call over a wireless local loop to the associated telephone number, which ends the process at step 422.

In another embodiment the voiced command is a voice mail request. In this case the home gateway system will play a plurality of voice mail options to the user. The user can then voice a desired choice. In this way the voice mail can be operated by voice commands entirely instead of requiring keypad entries.

In another embodiment the voiced command is an email request. In this case the voice processing system converts the titles of each of the emails in a user's mailbox from text to an audio signal. Then the titles are announced to the user. The user then announces his voiced selection. The voice processing system then converts the body of the email to an audio signal and plays the email to the user. This allows the user to interact with his email in at a purely vocal level. In another embodiment the home gateway system first initiates a communication session over the wireless local loop to an email provider. The user's emails (plurality of emails) are then downloaded to the home gateway system.

In yet another embodiment the voice command is a request to forward a user's calls to a predetermined telephone number (predetermined, forwarded telephone number). In this case the home gateway system requests a user voice a code. The home gateway system then performs speaker verification on the code to verify the user's identity. When the user's identity is verified, the user is allowed to state a voiced command that forwards his call to a predetermined number. This embodiment allows a user to forward his calls using only voiced commands and verifies the user's identity for security.

In another embodiment, the home gateway system is used for conference calls. A first telephone call is established, then a conference call command is given. The command can be a flash hook, a voice command or a touch pad code on the telephone for instance. Next, a second telephone call is connected through a voice bridge. Then the first telephone call is connected through the voice bridge.

Figure 20:
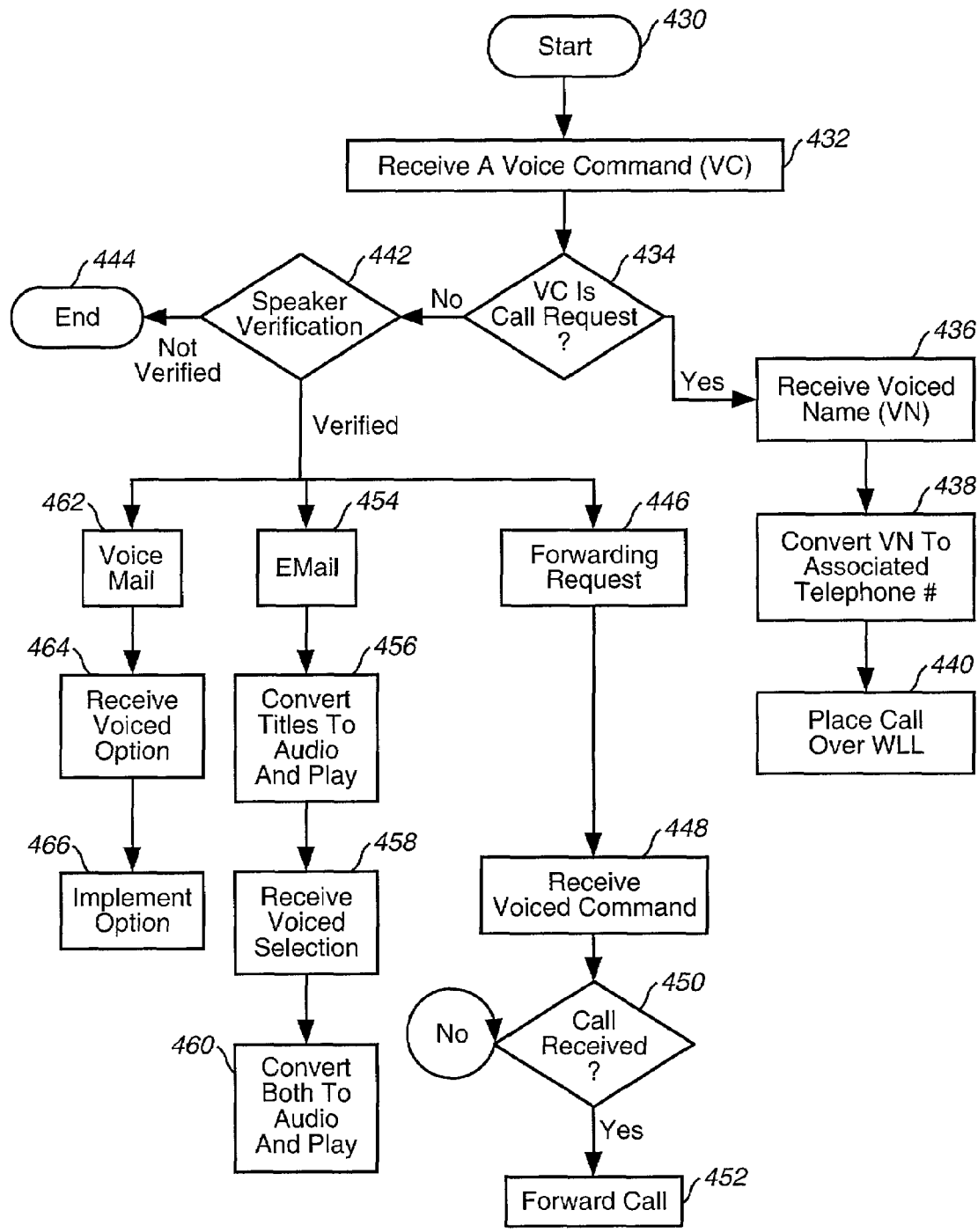
FIG. 20 is a flow chart of a method of operating a home gateway system in accordance with one embodiment of the invention.

FIG. 20 is a flow chart of a method of operating a home gateway system in accordance with one embodiment of the invention. The method starts, step 430, by receiving a voiced command at step 432. Next it is determined if the voiced command is a call request at step 434. When the voiced command is the call request, a voiced name is received at step 436. The voiced name is recognized by a speech recognition system and converted to an associated telephone number at step 438. A call is then placed to the associated telephone number over the wireless local loop (WLL) connection at step 440.

When the voiced command is not a call request, a speaker verification routine is performed at step 442. When the user is not verified, the user is denied access to the home gateway system's features and the process ends, step 444. In another embodiment, the user is asked to input a PIN (Personal Identification Number) when the system cannot verify their voice. When the user is verified, the user selects between the voice mail system, the email system and a forwarding request. When the user selects a forwarding request at step 446, the system receives a voiced command directing that the user's call be directed to a particular number at step 448. The home gateway system then waits for an incoming call at step 450. When an incoming call is received determine if a call forward cancel command is received. When a call forward command is not received, the call is forwarded at step 452.

When the user selects the email system at step 454, the titles of the emails are converted to an audio signal and played to the user at step 456. The user then voices a selection at step 458. The body of the selected email is then converted to an audio signal and played to the user at step 460. In one embodiment the process then allows the user to enter another voice command.

When the user selects the voice mail system at step 462, the voice mail system then plays the options to the user. At step 464 the user states a voiced option. The option is then implemented at step 466. In one embodiment the process then allows the user to enter another voice command.

Figure 21:
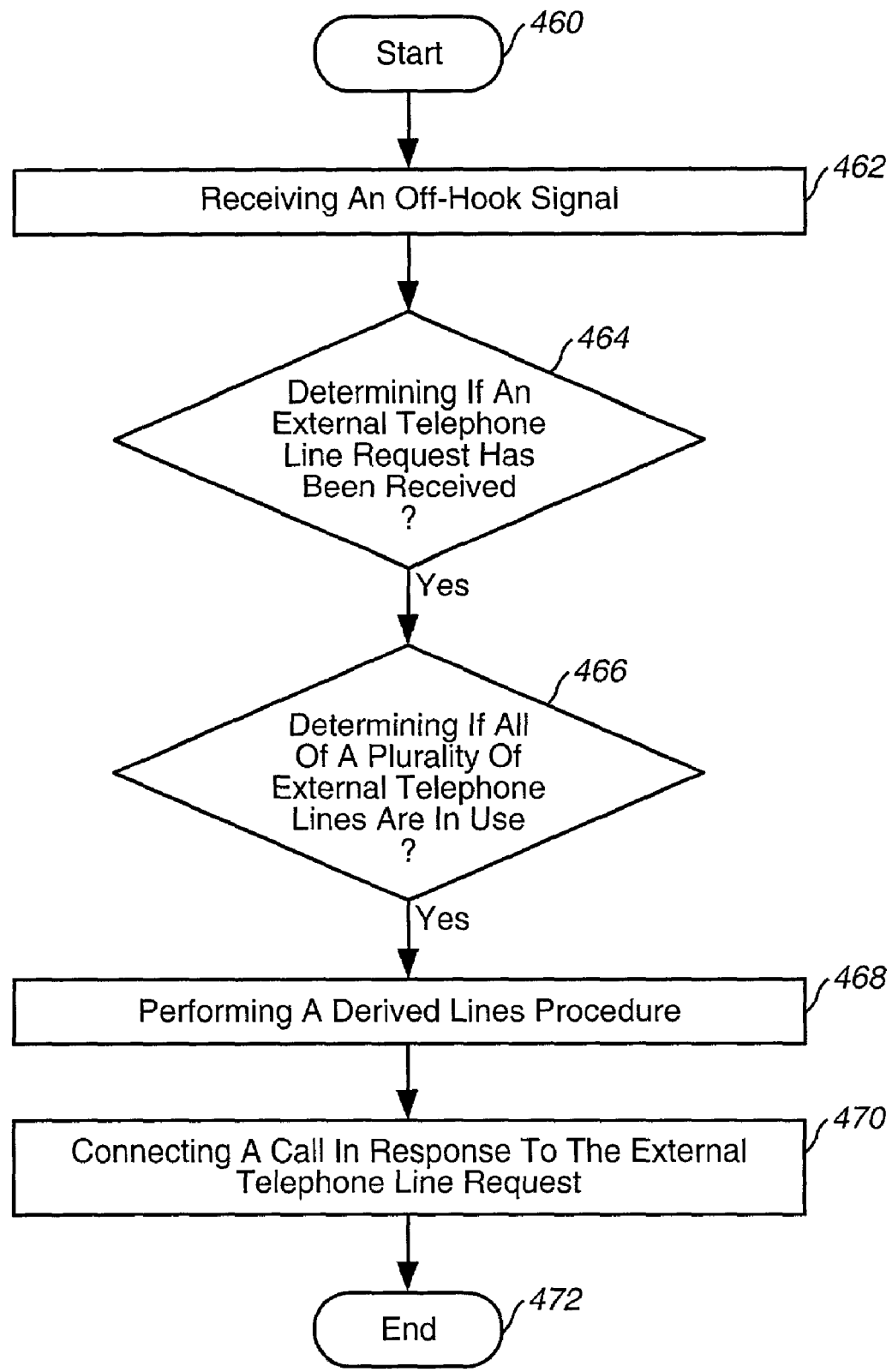
FIG. 21 is a flow chart of a method of using a derived lines procedure in a home gateway system in accordance with one embodiment of the invention.

FIG. 21 is a flow chart of a method of using a derived lines procedure in a home gateway system in accordance with one embodiment of the invention. The process starts, step 460, by receiving an off-hook signal at step 462. Next, it is determined if an external telephone line request has been received at step 464. It is only necessary to perform the derived lines process when an external telephone line request is received. Next, it is determined if all of a plurality of external telephone lines are in use at step 466. When all the external telephone lines are in use, a derived lines procedure is performed at step 468. The derived lines procedure steals bandwidth from the other lines to create another line. At step 470, the call is connected over the derived line, which ends the process at step 472.

Figure 22:
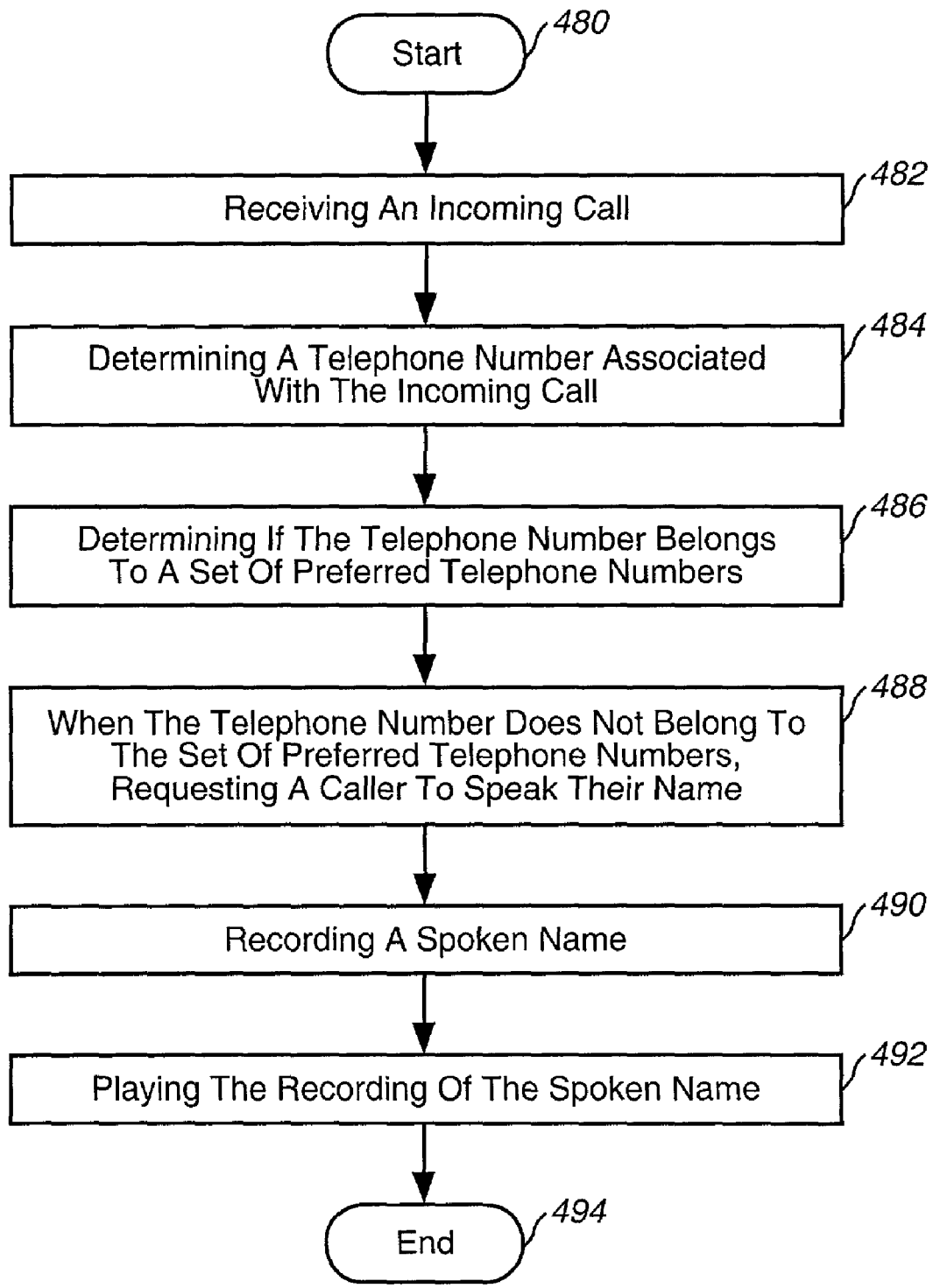
FIG. 22 is a flow chart of a method of operating a home gateway system in accordance with one embodiment of the invention.

FIG. 22 is a flowchart of a method of operating a home gateway system in accordance with one embodiment of the invention. The method starts, step 480, by receiving an incoming call at step 482. Next, a telephone number associated with the incoming call at step 484. At step 486 it is determined if the telephone number belongs to a set of preferred telephone numbers. When the telephone number does not belong to the set of preferred telephone numbers, a caller is requested to speak their name at step 488. At step 490 the spoken name is recorded. The recording of the spoken name is played; at step 492, so the user can determine whether to answer the phone, which ends the process at step 494.

Figure 23:
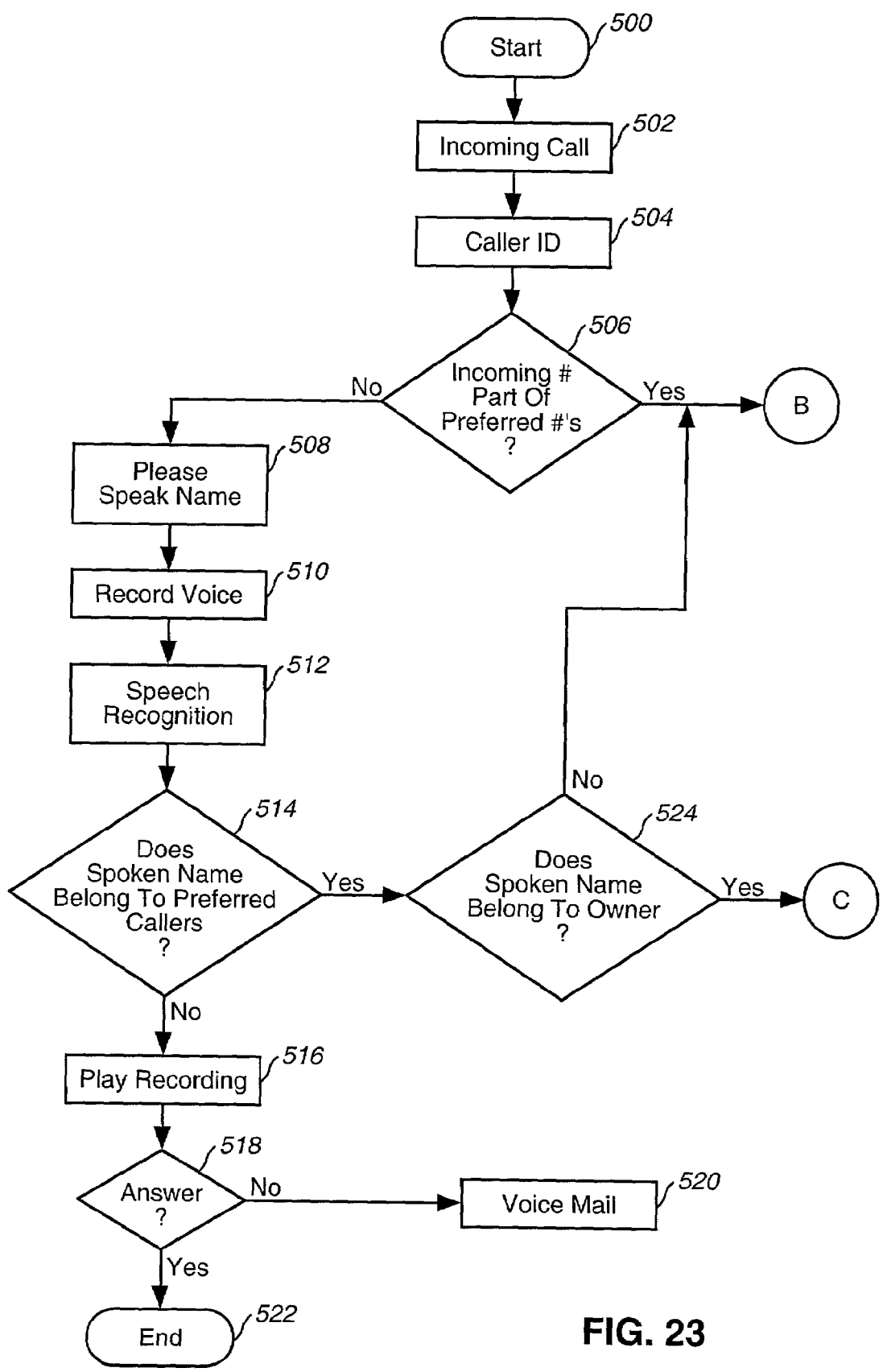
FIGS. 23 & 24 are a flow chart of a method of operating a home gateway system in accordance with one embodiment of the invention.
Figure 24:
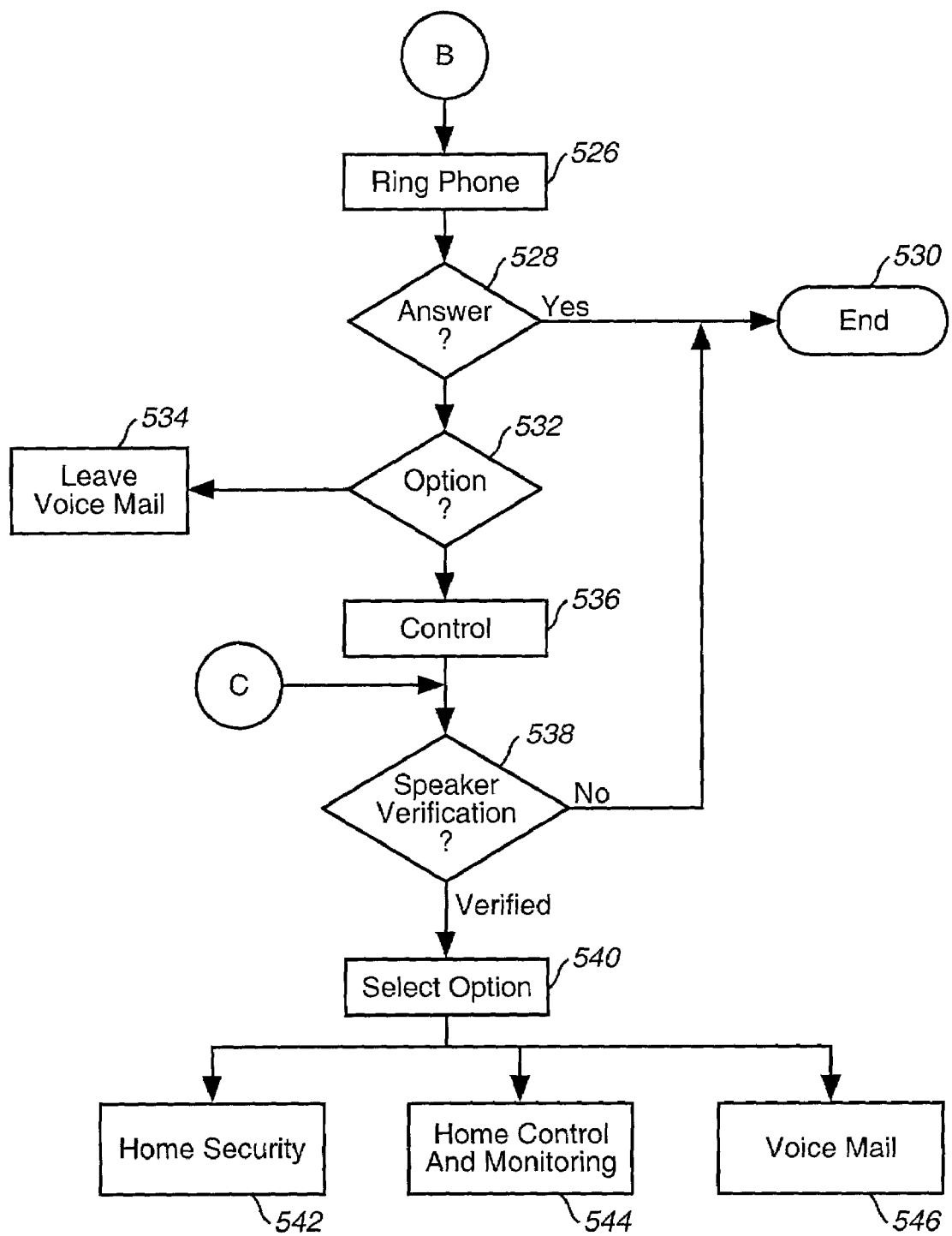

FIGS. 23 & 24 are a flow chart of a method of operating a home gateway system in accordance with one embodiment of the invention. The process starts, step 500, by receiving an incoming call at step 502. At step 504 the caller ID system determines a telephone number associated with the incoming call. Next, it is determined at step 506 if the incoming telephone number is part of a set of preferred set of telephone numbers. When the incoming number is not part of the preferred set of numbers, the caller is asked to speak their name at step 508. A recording of the spoken name is made at step 510. A speech recognition process is performed at step 512. At step 514 it is determined if the spoken name belongs to a set of preferred callers (recognized name). When the spoken name does not belong to the set of preferred callers, the recording of the spoken name is played at step 516. If the user decides not to answer the call, at step 518, the call is sent to voice mail at step 520. In another embodiment the home gateway system just hangs up on the incoming call. If the user decides to answer the call, at step 518, that ends the process at step 522.

When the spoken name does belong to the set of preferred callers at step 514, it is determined if the spoken name belongs to an owner (set of owners) at step 524. When the spoken name does not belong to an owner, at step 524, or the incoming telephone number is part of the preferred telephone numbers, at step 506, the telephone is rung at step 526. When the telephone is answered at step 428, that ends the process at step 530. When the telephone is not answered within a predetermined time at step 528, the user is provided a number of options (plurality of options) at step 532. The options fall into two categories, leaving a voice mail, step 534, or control options at step 536. Before the caller is allowed access to the control options a speaker verification process is performed at step 538. If the speaker cannot be verified, the process ends, step 530. In another embodiment, the user is asked to enter a PIN, if the system cannot verify their voice. When the speaker is verified, they are provided a number of control options at step 540. These options include controlling or monitoring the home security system at step 542, controlling or monitoring the home appliances, lights, etc. at step 544 or controlling the voice mail system at step 546.

Thus there has been described a home gateway system that integrates the information carrying needs of a home user. The home gateway system combines a full service voice answering and reception capability, with internal switched connections, a router for data communications products, a home automation and a security system and a television processing system. Using the home gateway system a user can easily place both standard and data telephone calls. The integration of these products and services allows the user to perform a number of sophisticated call screening and processing functions. In addition, the home gateway system combines the home security system and computer networks with the telephone systems to bring about operational synergies. Using the invention described herein the communication functions are integrated with a home automation and security system to allow remote access to the home automation and security system. In addition, the home automation and security system can automatically send messages to the police, fire department, hospital or to owner at work.

The methods described herein can be implemented as computer-readable instructions stored on a computer-readable storage medium that when executed by a computer would perform the methods described herein.

While the invention has been described in conjunction with specific embodiments thereof, it is evident that many alterations, modifications, and variations will be apparent to those skilled in the art in light of the foregoing description. For instance, the home gateway system is generally described with respect to a wireless local loop, however the home gateway system can also be used with a standard wired local loop. Accordingly, it is intended to embrace all such alterations, modifications, and variations in the appended claims.

What is claimed is:

1. A method of operating a home gateway system comprising:
    connecting a telephone to an interface of the home gateway system, wherein the home gateway system is located at a subscriber household;
    detecting an input of a destination telephone number;
    triggering on a call request at a switch of the home gateway system and sending a query to a processor of the home gateway system;
    receiving a reply from the processor including a number of an internet service provider;
    establishing a connection with the internet service provider via the home gateway system based on the number of the internet service provider in response to the input of the destination telephone number; and
    sending a message to the internet service provider including the destination telephone number.

2. The method of claim 1, further including:
    receiving an audio signal from the telephone;
    digitizing the audio signal to form a digitized signal;
    packetizing the digitized signal to form a plurality of outgoing packets; and
    transmitting the plurality of outgoing packets to the internet service provider.

3. The method of claim 2, further including:
    receiving a plurality of incoming packets from the internet service provider;
    converting the plurality of incoming packets into an incoming audio signal; and
    connecting the incoming audio signal to the telephone.

4. The method of claim 2, wherein digitizing the audio signal to form the digitized signal comprises compressing the digitized signal.

5. The method of claim 2, wherein transmitting the plurality of outgoing packets to the internet service provider comprises:
    determining a priority of the plurality of outgoing data packets; and
    when the priority is low, storing the plurality of outgoing data packets until all high priority data packets have been transmitted.

6. The method of claim 1, wherein establishing the connection with the internet service provider comprises:
    establishing a wireless local loop connection to a base station; and
    connecting the base station to the internet service provider.

7. The method of claim 1, wherein the call request is associated with the input of the destination telephone number.

8. The method of claim 1, wherein the interface of the home gateway system is a telephony interface.

9. The method of claim 1, wherein establishing a connection with the internet service provider comprises establishing a telephony connection with the internet service provider.

10. A system comprising:
    a home gateway system for installation at a subscriber site and configured to be communicatively coupled to a plurality of telephones in the subscriber site, the home gateway system comprising:
        a transceiver;
        a switch connected to the transceiver;
        a processor connected to the switch; and a router connected to the switch, the router to receive a data packet from an internal port coupled to one of the telephones in the subscriber site, wherein the data packet includes an external address, wherein the router is to send a request to the processor to establish a communication session with an internet service provider, and wherein the processor is to direct the transceiver to establish a connection with the internet service provider.

11. The system of claim 10, wherein the transceiver is to establish a wireless local loop connection to a base station as part of the connection.

12. The system of claim 10, wherein the processor is to direct the transceiver to setup an asymmetric data channel.

13. The system of claim 10, further including a television processing system connected to the router.

14. The system of claim 13, wherein the television processing system is to receive information from an internet information provider, and to send the information via a selected channel of a television.

15. The system of claim 14, wherein the television processing system is to receive an email request, direct the processor to download an email to the television processing system, and to send the email via the selected channel of the television.

16. The system of claim 13, further including an emergency broadcast network receiver connected to the television processing system.

17. The system of claim 10, further including a voice mail system.

18. The system of claim 10, wherein the connection with the internet service provider is a telephony connection.

19. The system of claim 10, wherein the internal port comprises an RJ11 interface to couple the one of the telephones to the home gateway system.

20. A home gateway system comprising:
a transceiver including a vocoder and a multiplexer;
a switch connected to the transceiver having a telephony input and a data telephony input;
a processor connected to the switch;
a router connected to the switch and capable of routing data between a plurality of ports;
a television processing system connected to the router, the television processing system capable of receiving information from the router and sending the information over a predetermined channel to a television for display; and
an emergency broadcast system receiver connected to the television processing system, wherein the switch is to receive a destination address via the data telephony input and to send a query to the processor, wherein the processor is to return a response including an internet phone provider number, wherein the switch is to pass the internet phone provider number to the transceiver, and wherein the transceiver is to establish a telephony connection with an internet phone provider including a wireless local loop connection to a base station.

* * * * *

UNITED STATES PATENT AND TRADEMARK OFFICE
CERTIFICATE OF CORRECTION

| | | |
|---|---|---|
| PATENT NO. | : 7,596,129 B2 | Page 1 of 1 |
| APPLICATION NO. | : 09/931288 | |
| DATED | : September 29, 2009 | |
| INVENTOR(S) | : Bossemeyer, Jr. et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Fourteenth Day of December, 2010

David J. Kappos
*Director of the United States Patent and Trademark Office*